(12) United States Patent
Yamamoto

(10) Patent No.: US 7,496,455 B2
(45) Date of Patent: *Feb. 24, 2009

(54) ELECTROMAGNETIC FLOWMETER

(75) Inventor: Tomoshige Yamamoto, Tokyo (JP)

(73) Assignee: Yamatake Corporation, Tokyo (JP)

( * ) Notice: Subject to any disclaimer, the term of this patent is extended or adjusted under 35 U.S.C. 154(b) by 105 days.

This patent is subject to a terminal disclaimer.

(21) Appl. No.: 11/628,556

(22) PCT Filed: Jun. 10, 2005

(86) PCT No.: PCT/JP2005/010684

§ 371 (c)(1),
(2), (4) Date: Nov. 29, 2006

(87) PCT Pub. No.: WO2005/121716

PCT Pub. Date: Dec. 22, 2005

(65) Prior Publication Data

US 2007/0234820 A1    Oct. 11, 2007

(30) Foreign Application Priority Data

Jun. 14, 2006  (JP)  ............................. 2004-175630

(51) Int. Cl.
G06F 19/00 (2006.01)
G01B 5/28 (2006.01)
G01B 5/30 (2006.01)

(52) U.S. Cl. ........................... 702/38; 702/100; 702/50; 73/861.12; 73/700; 73/1.16

(58) Field of Classification Search .................. 702/38, 702/45, 50, 100; 73/861.12, 861.16, 861.17, 73/700, 735, 1.16

See application file for complete search history.

(56) References Cited

U.S. PATENT DOCUMENTS 4,408,497 A * 10/1983 Suzuki ..................... 73/861.17

(Continued)

FOREIGN PATENT DOCUMENTS

JP  2004-108973 A  4/2004

(Continued)

OTHER PUBLICATIONS

Boccalon et al., 'Noninvasitve electromagnetic blood flowmeter Theoretical aspects and technical evaluation', 1982, Medical & Biological Eng. & Computer, pp. 671-680.*

(Continued)

*Primary Examiner*—Edward Raymond
*Assistant Examiner*—Elias Desta
(74) *Attorney, Agent, or Firm*—Blakely, Sokoloff, Taylor & Zafman

(57) ABSTRACT

An electromagnetic flowmeter includes a measuring tube (1) through which a fluid to be measured flows, electrodes (2a, 2b) which are placed in this measuring tube and detect an electromotive force generated by a magnetic field applied to the fluid and the flow of the fluid, an exciting coil (3) and power supply unit (4) which apply a time-changing magnetic field to the fluid, a signal conversion unit (5) which extracts a ∂A/∂t component from the resultant electromotive force of the electromotive force based on the ∂A/∂t component irrelevant to the flow velocity of the fluid and the electromotive force based on a v×B component originating from the flow velocity of the fluid, which are detected by the electrodes (2a, 2b), and a flow rate output unit (6) which extracts only the v×B component by removing the extracted ∂A/∂t component from the resultant electromotive force, and calculates the flow rate of the fluid based on the v×B component.

12 Claims, 12 Drawing Sheets

U.S. PATENT DOCUMENTS

| | | | |
|---|---|---|---|
| 4,709,583 A * | 12/1987 | De Paepe et al. | 73/861.17 |
| 4,726,236 A * | 2/1988 | Wada | 73/861.16 |
| 5,625,155 A * | 4/1997 | Yoshida | 73/861.11 |
| 2007/0220993 A1 * | 9/2007 | Yamamoto | 73/861.16 |

FOREIGN PATENT DOCUMENTS

| | | |
|---|---|---|
| JP | 2004-108975 A | 4/2004 |
| WO | WO 03/027614 A | 4/2003 |

OTHER PUBLICATIONS

JNMIHF edition, "Flow Rate Measurement A to Z for Instrumentation Engineers", Kogyo Gijutusha, 1995, pp. 143-160, Abstract.

* cited by examiner

ELECTROMAGNETIC FLOWMETER

The present patent application is a non-provisional application of International Application No. PCT/JP2005/010684, filed Jun. 10, 2005.

TECHNICAL FIELD

The present invention relates to an electromagnetic flowmeter which measures the flow rate of a fluid to be measured which flows in a measuring tube and, more particularly, to a zero correction technique of automatically correcting a zero point shift.

BACKGROUND ART

An electromotive flowmeter of a sine wave excitation scheme using a sine wave for an exciting current to be supplied to an exciting coil has a drawback susceptible to commercial frequency noise. A high-frequency excitation scheme using an exciting current with an increased frequency can solve this drawback. An electromotive flowmeter of a high-frequency excitation scheme is disclosed in, for example, JNMIHF edition, "Flow Rate Measurement A to Z for Instrumentation Engineers", Kogyo Gijutusha, 1995, pp. 143-160 (reference 1). The high-frequency excitation scheme has a merit of being robust against 1/f noise such as electrochemical noise and spike noise and can improve responsiveness (characteristic of making a flow rate signal quickly follow up a change in flow rate).

The electromagnetic flowmeter of the sine wave excitation scheme has a structure in which a magnetic field is always changing, and the magnetic field is symmetrically distributed on the front and rear sides of the measuring tube, which are bordered on an electrode axis, in order to eliminate the influences of inter-electrode electromotive force components produced by this change in magnetic field. In practice, as the positions of electrodes and leads shift and the symmetry of the magnetic field generated from a coil deteriorates, the electromagnetic flowmeter is influenced by the components generated by temporal changes in magnetic field. The electromagnetic flowmeter of the sine wave excitation scheme therefore removes the influences of components generated by temporal changes in magnetic field as offsets at the time of calibration. However, the electromagnetic flowmeter is influenced by a magnetic field shift, a change in magnetic field distribution, and the like, and the zero point of the output of the electromagnetic flowmeter inevitably shifts. In addition, although the electromagnetic flowmeter of the sine wave excitation scheme cancels components due to changes in magnetic field by phase detection, since this phase detection is not stable, the zero point of the output is poor in stability.

An electromagnetic flowmeter of a rectangular wave excitation scheme, which uses a rectangular wave for an exciting current to be supplied to an exciting coil, uses a technique of detecting an inter-electrode electromotive force when a magnetic field stops changing, and hence is superior in the stability of the zero point of the output to the sine wave excitation scheme (see, for example, reference 1). The electromagnetic flowmeter of the rectangular wave excitation scheme cannot ignore the influences of the impedance of the exciting coil, the responsiveness of an exciting current, the responsiveness of a magnetic field, and overcurrent losses in the core of the exciting coil and the measuring tube as the frequency of the exciting current increases. This makes it difficult to maintain rectangular wave excitation (i.e., to detect an inter-electrode electromotive force in a place where no magnetic field change occurs), and makes it impossible to ensure the stability of the zero point of the output. As a consequence, in the case of the electromagnetic flowmeter of the rectangular wave excitation scheme, it is difficult to perform high-frequency excitation, and it is impossible to improve responsiveness with respect to a change in flow rate and remove 1/f noise.

Either the sine wave excitation scheme or the rectangular wave excitation scheme does not allow recognition of whether the zero point has shifted, while a fluid to be measured is kept flowing. This makes it necessary to stop the fluid to be measured so as to set the flow rate to 0, check whether the zero point of the output has shifted, and correct the offset of the set zero point.

The shift of the zero point of the output will be described with reference to FIG. 18. Referring to FIG. 18, U1 and U3 represent periods during which the flow velocity of the fluid to be measured is 0, and U2 represents a period during which the flow velocity is 1 (m/sec). Assume that, in spite of the fact that the flow velocity of a fluid to be measured has not changed, a magnitude V of the flow velocity measured by the electromagnetic flowmeter changes. In this case, the shift of the zero point can be thought of as a factor for this output variation.

Assume that the electromagnetic flowmeter is calibrated such that in an initial state, when the flow rate of a fluid to be measured is 0, an output from the electromagnetic flowmeter is 0 (v), and when the flow velocity is 1 (m/sec), the output becomes 1 (v). In this case, an output from the electromagnetic flowmeter is a voltage representing the magnitude V of a flow velocity. With this calibration, if the flow velocity of a fluid to be measured is 1 (m/sec), an output from the electromagnetic flowmeter should be 1 (v). When a given time t1 elapses, however, an output from the electromagnetic flowmeter becomes 1.5 (v) in spite of the fact that the flow velocity of the fluid to be measured remains at 1 (m/sec). Even if the flow velocity is returned to 0, 0.5 (v) may be output; the output may not become 0. The shift of the zero point can be though of as a factor for this output variation. The phenomenon of the shift of the zero point occurs as the voltage generated by a change in magnetic field varies due to a change in the ambient temperature of the electromagnetic flowmeter or the like, and the variation cannot be canceled.

DISCLOSURE OF INVENTION

Problem to be Solved by the Invention

As described above, the electromagnetic flowmeter of the conventional sine wave excitation scheme cannot ensure the stability of the zero point of the output. In addition, the electromagnetic flowmeter of the rectangular wave excitation scheme cannot ensure the stability of the zero point in high-frequency excitation. Either the sine wave excitation scheme or the rectangular wave excitation scheme cannot correct any error in the zero point of the output while a fluid to be measured is flowing.

The present invention has been made to solve the above problem, and has as its first object to provide an electromagnetic flowmeter which can ensure the stability of the zero point of an output even in high-frequency excitation.

It is the second object of the present invention to provide an electromagnetic flowmeter which can correct an error in the zero point of an output without setting the flow rate of a fluid to be measured to 0.

Means of Solution to the Problem

According to the present invention, there is provided an electromagnetic flowmeter comprising a measuring tube through which a fluid to be measured flows, an exciting unit which applies a time-changing magnetic field to the fluid, an electrode which is placed in the measuring tube and detects a resultant electromotive force of an electromotive force based on a ∂A/∂t component (where A is a vector potential and t is a time) which is generated by a magnetic field applied to the fluid and a flow of the fluid and is irrelevant to a flow velocity of the fluid and an electromotive force based on a v×B component (where v is a flow velocity and B is a magnetic flux density) originating from the flow velocity of the fluid, a signal conversion unit which extracts the ∂A/∂t component from the resultant electromotive force, and a flow rate output unit which extracts only the v×B component by removing the extracted ∂A/∂t component from the resultant electromotive force, and calculates the flow rate of the fluid from the v×B component.

Effects of the Invention

According to the present invention, an electromagnetic flowmeter extracts a ∂A/∂t component irrelevant to the flow velocity of a fluid from the resultant electromotive force of the electromotive force based on the ∂A/∂t component and the electromotive force based on a v×B component originating from the flow velocity of the fluid, and extracts only the v×B component by removing the ∂A/∂t component from the resultant electromotive force, thereby calculating the flow rate of the fluid from the v×B component. This makes it possible to correct the zero point of the output of the electromagnetic flowmeter without setting the flow rate of the fluid to 0 and ensure the stability of the zero point even in high-frequency excitation.

BEST MODE FOR CARRYING OUT THE INVENTION

Figure 1A:
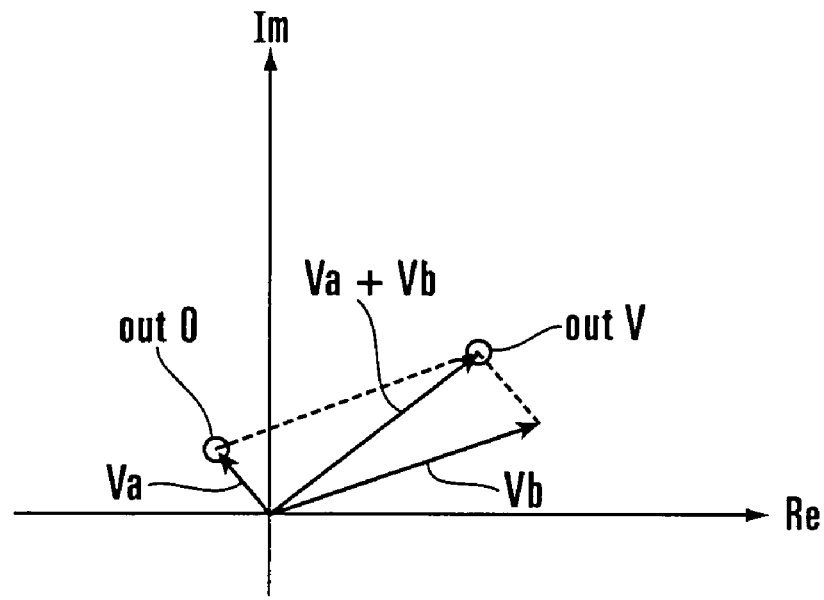
FIG. 1A is a view for explaining the basic principle of an electromagnetic flowmeter of the present invention, and showing a ∂A/∂t component vector and a v×B component vector.

A physical phenomenon necessary for explanation of the present invention will be described first.

When an object moves in a temporally changing magnetic field, electromagnetic induction generates two types of electric fields, namely (a) electric field $E^{(i)}=\partial A/\partial t$ which is generated by a temporal change in magnetic field, and (b) electric field $E^{(v)}=v \times B$ which is generated as the object moves in the magnetic field. In this case, v×B represents the outer product of v and B, ∂A/∂t represents the partial differential of A with respect to time. In this case, v, B, and A respectively correspond to the following and are vectors having directions in three dimensions (x, y, and z) (v: flow velocity, B: magnetic flux density, and A: vector potential (whose relationship with the magnetic flux density is represented by B=rotA). Note, however, that the three-dimensional vectors in this case differ in meaning from vectors on a complex plane. These two types of electric fields generate a potential distribution in the fluid, and electrodes can detect this potential.

Mathematical basic knowledge necessary to understand the present invention will be described next.

A cosine wave P·cos(ω·t) and a sine wave Q·sin(ω·t) which have the same frequency but different amplitudes are combined into the following cosine wave. Let P and Q be amplitudes, and ω be an angular frequency.

$$P\cdot\cos(\omega\cdot t)+Q\cdot\sin(\omega\cdot t)=(P^2+Q^2)^{1/2}\cdot\cos(\omega\cdot t-\epsilon) \text{ for } \epsilon=\tan^{-1}(Q/P) \quad (1)$$

In order to analyze the combining operation in equation (1), it is convenient to perform mapping on a complex coordinate plane so as to plot an amplitude P of cosine wave P·cos(ω·t) along a real axis and an amplitude Q of the sine wave Q·sin(ω·t) along an imaginary axis. That is, on the complex coordinate plane, a distance $(P^2+Q^2)^{1/2}$ from the origin gives the amplitude of the combined wave, and an angle $e=\tan^{-1}(Q/P)$ with respect to the real axis gives the phase difference between the combined wave and ω·t.

In addition, on the complex coordinate plane, the following relational expression holds.

$$L\cdot\exp(j\cdot\epsilon)=L\cdot\cos(\epsilon)+j\cdot L\cdot\sin(\epsilon) \quad (2)$$

Equation (2) is an expression associated with a complex vector, in which j is an imaginary unit, L gives the length of the complex vector, and e gives the direction of the complex vector. In order to analyze the geometrical relationship on the complex coordinate plane, it is convenient to use conversion to a complex vector.

The following description uses mapping onto a complex coordinate plane like that described above and geometrical analysis using complex vectors to show how an inter-electrode electromotive force behaves and explain how the present invention uses this behavior.

[Basic Principle of Present Invention]

The present invention focuses attention to the fact that when a resultant vector Va+Vb of a vector Va of a ∂A/∂t component and a vector Vb of a v×B component is obtained from the inter-electrode electromotive force detected by the electrode of the electromagnetic flowmeter, the vector Va is a vector which depends on only a temporal change in magnetic field but is irrelevant to the flow velocity of the fluid to be measured, and the vector Vb is a vector whose magnitude changes in proportion to the magnitude V of the flow velocity of the fluid to be measured.

Setting the exciting frequency to 0 makes it possible to extract only the vector Vb from the resultant vector Va+Vb. However, noise has a large influence on an output in a low-frequency region, and hence this technique is not practical. According to the present invention, therefore, only the vector Vb of the v×B component is substantially extracted by extracting an estimated value Va' of the vector Va of the ∂A/∂t component from the resultant vector Va+Vb and subtracting the estimated value Va' from the resultant vector Va+Vb, and the magnitude V of the flow velocity of the fluid to be measured is calculated on the basis of the v×B component. It is important to extract only the vector Vb without setting the vector Vb to 0 (setting the flow rate to 0) or setting the vector Va to 0 (setting the exciting frequency to 0).

Figure 1B:
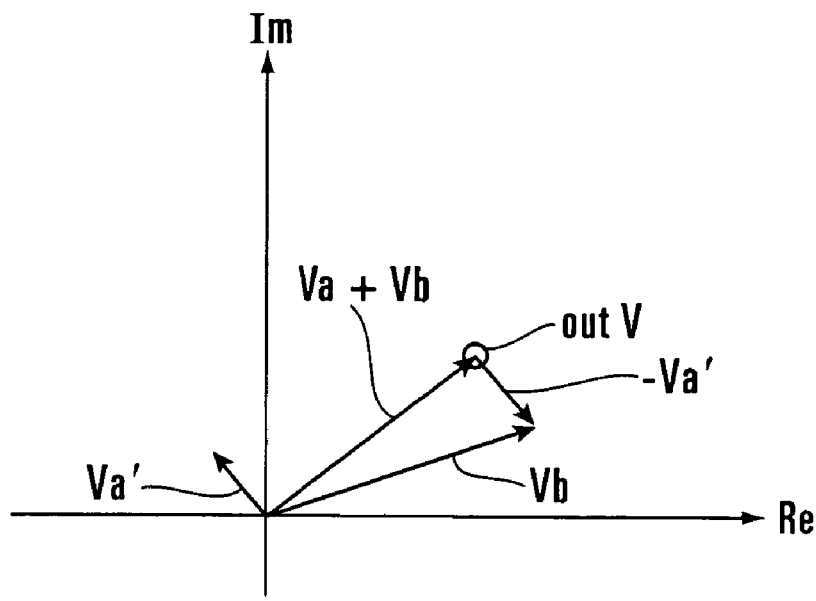
FIG. 1B is a view for explaining the basic principle of the electromagnetic flowmeter of the present invention, and showing the v×B component vector obtained by subtracting the ∂A/∂t component vector from a resultant vector.

The basic principle of the present invention configured to actually correct the zero point of the output of the electromagnetic flowmeter will be described below with reference to FIGS. 1A and 1B. Referring to FIGS. 1A and 1B, reference symbol Re denotes a real axis; Im, an imaginary axis; out0, an output obtained before zero correction when the flow velocity is 0; and outV, an output obtained before zero correction when the flow velocity is V. The vector mapped on a complex plane on the basis of the amplitudes of a measured inter-electrode electromotive force and a phase difference corresponds to the resultant vector Va+Vb of the vector Va of the ∂A/∂t component and the vector Vb of the v×B component.

$$Va=r\omega\cdot\exp(j\cdot\theta\omega)\cdot\omega \quad (3)$$

$$Vb=rv\cdot\exp(j\cdot\theta v)\cdot V \quad (4)$$

FIG. 1A shows the vectors Va and Vb. The vector Va of the ∂A/∂t component is the electromotive force generated by a change in magnetic field, and hence has a magnitude proportional to an exciting angular frequency ω. In this case, let rω be a known proportional constant portion corresponding to the magnitude of the vector Va, and θω be the direction of the vector Va. In addition, the vector Vb of the v×B component is the electromotive force generated by the movement of the fluid to be measured in the measuring tube, and hence has a magnitude proportional to the magnitude V of the flow velocity. In this case, let rv be a known proportional constant portion corresponding the magnitude of the vector Vb, and θv be the direction of the vector.

A factor for a variation in the zero point of the output of the electromagnetic flowmeter is a variation in ∂A/∂t component. Therefore, obtaining the magnitude V of the flow velocity by a signal conversion expression in which the estimated value Va' of the vector Va of the ∂A/∂t component is extracted and removed from the resultant vector Va+Vb makes it possible to almost implement automatic zero point correction. The following two methods are available as methods of extracting the estimated value Va' of the vector Va of the ∂A/∂t component.

The first extraction method is a method of switching between two exciting frequencies and extracting the estimated value Va' of the vector Va of the ∂A/∂t component from the difference between inter-electrode electromotive forces in two excitation states with different exciting frequencies. As described above, the complex vector that can be directly obtained from the inter-electrode electromotive forces is the resultant vector Va+Vb, and the vectors Va and Vb cannot be directly measured. It is therefore noted that the magnitude of the vector Va of the ∂A/∂t component is proportional to the exciting angular frequency ω, and the vector Vb of the v×B component does not depend on the exciting angular frequency ω. More specifically, this method obtains the difference between the resultant vector Va+Vb obtained when excitation is performed with a given angular frequency ω0 and the resultant vector Va+Vb obtained when excitation is performed with another angular frequency ω1. This difference corresponds to a vector representing only a change in the magnitude of the vector Va of the ∂A/∂t component, which therefore allows to extract the estimated value Va' of the vector Va from the change.

The second extraction method is a method of extracting the estimated value Va' of the vector Va of the ∂A/∂t component by applying magnetic fields based on a plurality of exciting frequencies to a fluid to be measured and using the frequency difference between a plurality of components contained in the inter-electrode electromotive force. The second extraction method is based on the same viewpoint as that of the first extraction method. More specifically, the second extraction method applies magnetic fields containing two components having the same magnitude and different frequencies from exciting from exciting coils to the fluid to be measured, and obtains the difference between the resultant vector Va+Vb of the first frequency component and the resultant vector Va+Vb of the second frequency component. This difference is a vector which provides only a change in the magnitude of the vector Va of the ∂A/∂t component. This makes it possible to extract the estimated value Va' of the vector Va from this change. The second extraction method differs from the first extraction method in that there is no need to switch exciting frequencies, and hence can quickly perform zero correction.

As shown in FIG. 1B, subtracting the estimated value Va' of the vector Va of the ∂A/∂t component from the resultant vector Va+Vb that can be measured makes it possible to extract the vector Vb of the v×B component. This allows to calculate the magnitude V of the flow velocity of the fluid to be measured from the vector Vb in the following manner:

$$V=(1/rv)\cdot Vb\approx(1/rv)\cdot\{|(Va+Vb)-Va'|\} \quad (5)$$

According to the above principle, since the magnitude V of the flow velocity of the fluid to be measured can be measured regardless of a variation in ∂A/∂t component induced from a time-changing magnetic field, automatic zero point correction is substantially implemented.

First Embodiment

The first embodiment of the present invention will be described in detail below with reference to the accompanying drawings. This embodiment uses the first extraction method of the methods described in association with the basic principle as a method of extracting an estimated value Va' of a vector Va of a ∂A/∂t component, and switches between two exciting frequencies to extract the estimated value Va' of the vector Va of the ∂A/∂t component from the difference between inter-electrode electromotive forces in two excitation states with different exciting frequencies.

Figure 2:
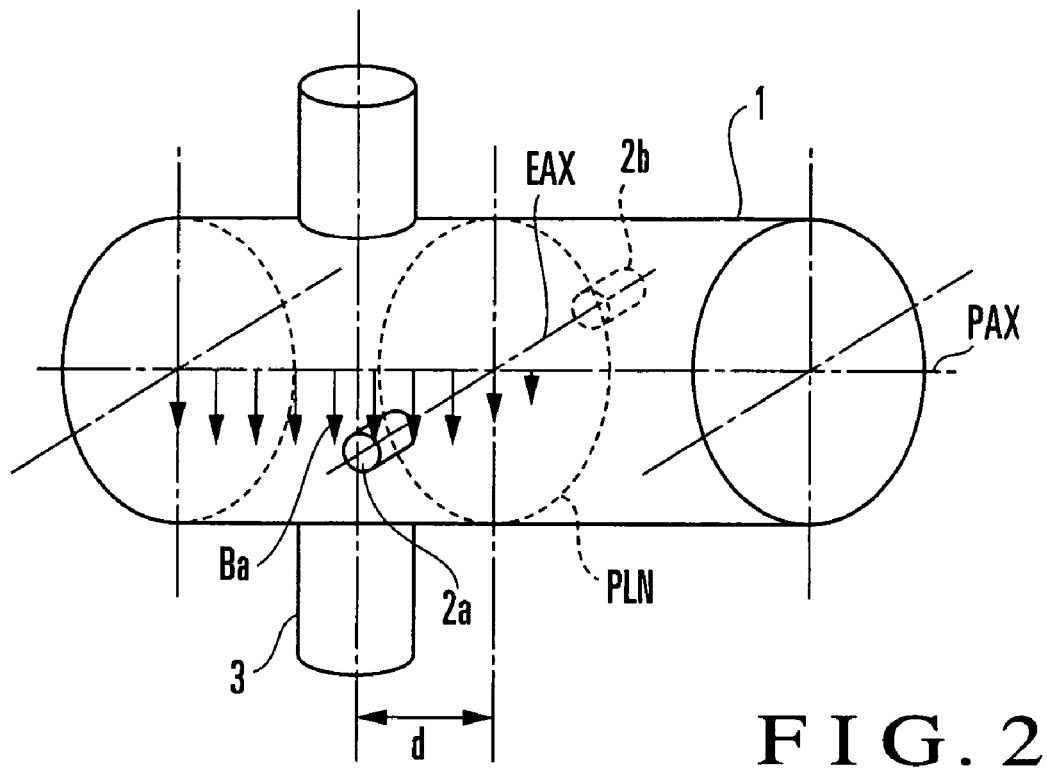
FIG. 2 is a block diagram for explaining the principle of an electromagnetic flowmeter according to the first embodiment of the present invention.

FIG. 2 is a block diagram for explaining the principle of the electromagnetic flowmeter in this embodiment. This electromagnetic flowmeter includes a measuring tube 1 through which a fluid to be measured flows, a pair of electrodes 2a and 2b which are placed to face each other in the measuring tube 1 so as to be perpendicular to both a magnetic field to be applied to the fluid and an axis PAX of the measuring tube 1 and come into contact with the fluid, and detect the electromotive force generated by the magnetic flow and the flow of the fluid, and an exciting coil 3 which applies, to the fluid, a time-changing magnetic field asymmetric on the front and rear sides of the measuring tube 1 which are bordered on a plane PLN which includes the electrodes 2a and 2b *perpendicular to the axis PAX of the measuring tube, with the plane PLN serving as a boundary of the measuring tube 1.

In FIG. 2, of a magnetic field Ba generated by the exciting coil 3, a magnetic field component (magnetic flux density) B1 orthogonal to both an electrode axis EAX connecting the electrodes 2a and 2b and the measuring tube axis PAX on the electrode axis EAX is given by $$B1=b1\cos(\omega 0\cdot t-\theta 1) \quad (6)$$

In equation (6), b1 is the amplitude of the magnetic field B1, ω0 is an angular frequency, and θ1 is a phase difference (phase delay) from ω0·t. The magnetic flux density B1 will be referred to as the magnetic field B1 hereinafter.

An inter-electrode electromotive force which originates from a change in magnetic field and is irrelevant to the flow velocity of a fluid to be measured will be described first. Since the electromotive force originating from the change in magnetic field depends on a time derivative dB/dt of the magnetic field, and hence the magnetic field B1 generated by the exciting coil 3 is differentiated according to $$dB1/dt=-\omega 0\cdot b1\cdot\sin(\omega 0\cdot t-\theta 1) \quad (7)$$

Figure 3:
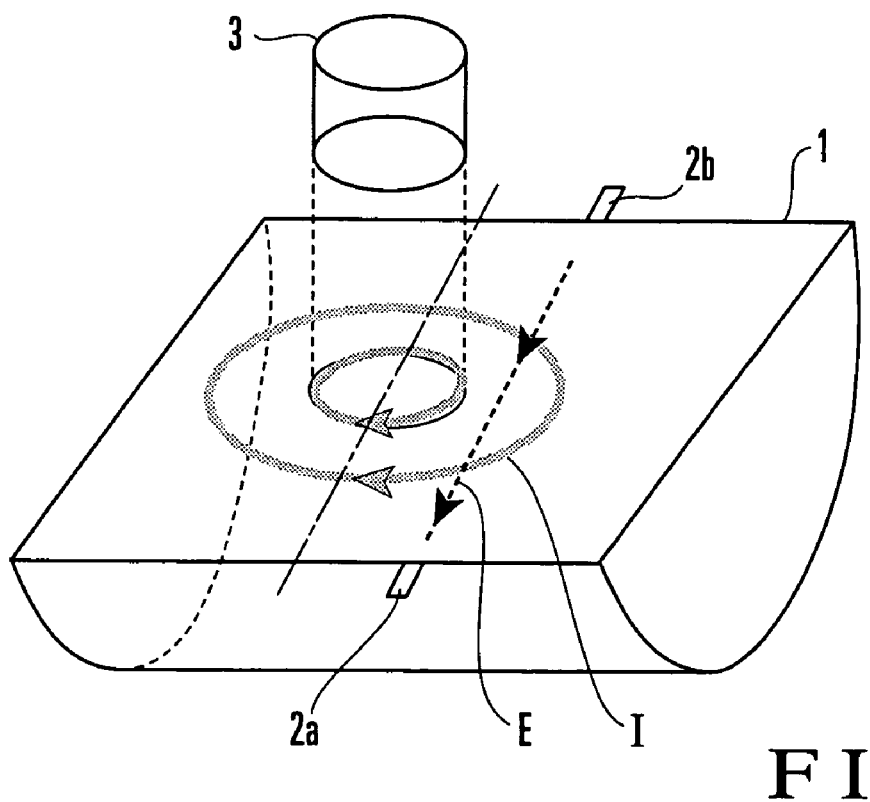
FIG. 3 is a view showing eddy currents and inter-electrode electromotive forces when the flow rate of a fluid to be measured is 0 in the electromagnetic flowmeter according to the first embodiment of the present invention.

If the flow velocity of the fluid to be measured is 0, a generated eddy current is only a component originating from a change in magnetic field. An eddy current I due to a change in the magnetic field Ba is directed as shown in FIG. 3. Therefore, an inter-electrode electromotive force E which is generated by a change in the magnetic field Ba and is irrelevant to the flow velocity is directed as shown in FIG. 3 within a plane including the electrode axis EAX and the measuring tube axis PAX. This direction is defined as the negative direction.

At this time, the inter-electrode electromotive force E is the value obtained by multiplying a time derivative −dB1/dt of a magnetic field whose direction is taken into consideration by a proportion coefficient rk, and substituting θ1+θ00 into the phase θ1 (rk and θ00 are associated with the conductivity and permittivity of the fluid to be measured and the structure of the measuring tube 1 including the arrangement of the electrodes 2a and 2b), as indicated by the following equation:

$$E=rk\cdot\omega 0\cdot b1\cdot\sin(\omega 0\cdot t-\theta 1-\theta 00) \quad (8)$$

Equation (8) is rewritten into the following equation:

$$\begin{aligned} E &= rk\cdot\omega 0\cdot b1\cdot\{\sin(-\theta 1-\theta 00)\}\cdot\cos(\omega 0\cdot t) + \\ &\quad rk\cdot\omega 0\cdot b1\cdot\{\cos(-\theta 1-\theta 00)\}\cdot\sin(\omega 0\cdot t) \\ &= rk\cdot\omega 0\cdot b1\cdot\{-\sin(\theta 1+\theta 00)\}\cdot\cos(\omega 0\cdot t) + \\ &\quad rk\cdot\omega 0\cdot b1\cdot\{\cos(\theta 1-\theta 00)\}\cdot\sin(\omega 0\cdot t) \end{aligned} \quad (9)$$

In this case, if equation (9) is mapped on the complex coordinate plane with reference to ω0·t, a real axis component Ex and an imaginary axis component Ey are given by $$\begin{aligned} Ex &= rk\cdot\omega 0\cdot b1\cdot\{-\sin(\theta 1+\theta 00)\} \\ &= rk\cdot\omega 0\cdot b1\cdot\{\cos(\pi/2+\theta 1+\theta 00)\} \end{aligned} \quad (10)$$

$$\begin{aligned} Ey &= rk\cdot\omega 0\cdot b1\cdot\{\cos(\theta 1+\theta 00)\} \\ &= rk\cdot\omega 0\cdot b1\cdot\{\sin(\pi/2+\theta 1+\theta 00)\} \end{aligned} \quad (11)$$

In addition, Ex and Ey represented by equations (10) and (11) are transformed into a complex vector Ec represented by $$\begin{aligned} Ec &= Ex + j\cdot Ey \\ &= rk\cdot\omega 0\cdot b1\cdot\{\cos(\pi/2+\theta 1+\theta 00)\} + \\ &\quad j\cdot rk\cdot\omega 0\cdot b1\cdot\{\sin(\pi/2+\theta 1+\theta 00)\} \\ &= rk\cdot\omega 0\cdot b1\cdot \\ &\quad \{\cos(\pi/2+\theta 1+\theta 00)+j\cdot\sin(\pi/2+\theta 1+\theta 00)\} \\ &= rk\cdot\omega 0\cdot b1\cdot\exp\{j\cdot(\pi/2+\theta 1+\theta 00)\} \end{aligned} \quad (12)$$

The inter-electrode electromotive force Ec represented by equation (12) which is transformed into complex coordinates becomes an inter-electrode electromotive force which originates from only a temporal change in magnetic field and is irrelevant to the flow velocity. In equation (12), rk·ω0·b1·exp{j·(p/2+θ1+θ00)} is a complex vector having a length rk·ω0·b1 and an angle p/2+θ1+θ00 with respect to the real axis.

In addition, the proportion coefficient rk and angle θ00 described above can be transformed into a complex vector kc to obtain the following equation:

$$kc = rk \cdot \cos(\theta 00) + j \cdot rk \cdot \sin(\theta 00) \quad (13)$$
$$= rk \cdot \exp(j \cdot \theta 00)$$

In equation (13), rk is the magnitude of the vector kc, and θ00 is the angle of the vector kc with respect to the real axis.

Figure 4:
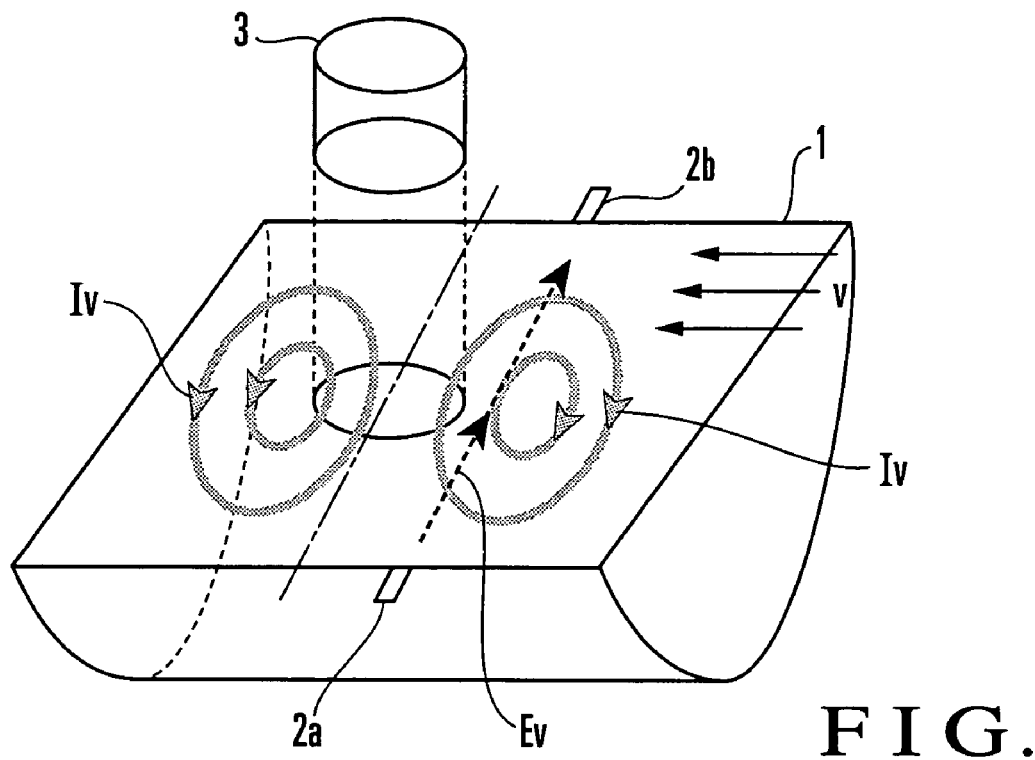
FIG. 4 is a view showing eddy currents and inter-electrode electromotive forces when the flow rate of a fluid to be measured is not 0 in the electromagnetic flowmeter according to the first embodiment of the present invention.

An inter-electrode electromotive force originating from the flow velocity of a fluid to be measured will be described next. Letting V (V≠0) be the magnitude of the flow velocity of the fluid, since a component v×Ba originating from a flow velocity vector v of the fluid is generated in a generated eddy current in addition to the eddy current I when the flow velocity is 0, an eddy current Iv generated by the flow velocity vector v and the magnetic field Ba is directed as shown in FIG. 4. Therefore, the direction of an inter-electrode electromotive force Ev generated by the flow velocity vector v and the magnetic field Ba becomes opposite to the direction of the inter-electrode electromotive force E generated by the temporal change, and the direction of Ev is defined as the positive direction.

In this case, as indicated by the following equation, the inter-electrode electromotive force Ev originating from the flow velocity is the value obtained by multiplying the magnetic field B1 by a proportion coefficient rkv, and substituting θ1+θ01 into the phase θ1 (rkv and θ1 are associated with a magnitude V of the flow velocity, the conductivity and permittivity of the fluidity to be measured, and the structure of the measuring tube 1 including the arrangement of the electrodes 2*a* and 2*b*):

$$Ev = rkv \cdot \{b1 \cdot \cos(\omega 0 \cdot t - \theta 1 - \theta 01)\} \quad (14)$$

Equation (14) is rewritten into $$Ev = rkv \cdot b1 \cdot \cos(\omega 0 \cdot t) \cdot \cos(-\theta 1 - \theta 01) - \quad (15)$$
$$rkv \cdot b1 \cdot \sin(\omega 0 \cdot t) \cdot \sin(-\theta 1 - \theta 01)$$
$$= rkv \cdot b1 \cdot \{\cos(\theta 1 + \theta 01)\} \cdot \cos(\omega 0 \cdot t) +$$
$$rkv \cdot b1 \cdot \{\sin(\theta 1 + \theta 01)\} \cdot \sin(\omega 0 \cdot t)$$

In this case, when mapping equation (15) on the complex coordinate plane with reference to ω0·t, a real axis component Evx and an imaginary axis component Evy are given by $$Evx = rkv \cdot b1 \cdot \{\cos(\theta 1 + \theta 01)\} \quad (16)$$

$$Evy = rkv \cdot b1 \cdot \{\sin(\theta 1 + \theta 01)\} \quad (17)$$

In addition, Evx and Evy represented by equations (16) and (17) are transformed into a complex vector Evc represented by $$Evc = Evx + j \cdot Evy \quad (18)$$
$$= rkv \cdot b1 \cdot \{\cos(\theta 1 + \theta 01)\} +$$
$$j \cdot rkv \cdot b1 \cdot \{\sin(\theta 1 + \theta 01)\}$$
$$= rkv \cdot b1 \cdot \{\cos(\theta 1 + \theta 01) + j \cdot \sin(\theta 1 + \theta 01)\}$$
$$= rkv \cdot b1 \cdot \exp\{j \cdot (\theta 1 + \theta 01)\}$$

The inter-electrode electromotive force Evc represented by equation (18) which is transformed into complex coordinates becomes an inter-electrode electromotive force which originates from the flow velocity of the fluid to be measured. In equation (18), rkv·b1·exp{j·(θ1+θ01)} is a complex vector having a length rk·b1 and an angle θ1+θ01 with respect to the real axis.

In addition, the proportion coefficient rkv and angle θ01 described above can be transformed into a complex vector kvc to obtain the following equation:

$$kvc = rkv \cdot \cos(\theta 01) + j \cdot rkv \cdot \sin(\theta 01) \quad (19)$$
$$= rkv \cdot \exp(j \cdot \theta 01)$$

In equation (19), rkv is the magnitude of the vector kvc, and θ01 is the angle of the vector kvc with respect to the real axis. In this case, rkv is equivalent to the value obtained by multiplying the proportional coefficient rk (see equation (13)) described above by the magnitude V of the flow velocity and a proportion coefficient γ. That is, the following equation holds:

$$rkv = \gamma \cdot rk \cdot V \quad (20)$$

An inter-electrode electromotive force Eac as a combination of inter-electrode electromotive force Ec originating from a temporal change in magnetic field and an inter-electrode electromotive force Evc originating from the flow velocity of the fluid is expressed by the following equation upon combining equation (12) and an equation obtained by substituting equation (20) into equation (18).

$$Eac = rk \cdot \omega 0 \cdot b1 \cdot \exp\{j \cdot (\pi/2 + \theta 1 + \theta 00)\} + \gamma \cdot rk \cdot V \cdot b1 \cdot \exp\{j \cdot (\theta 1 + \theta 01)\} \quad (21)$$

As is obvious from equation (21), an inter-electrode electromotive force Eac is written by two complex vectors, i.e., the ∂A/∂t component rk·ω0·b1·exp{j·(p/2+θ1+θ00)} and the v×B component γ·rk·V·b1·exp{j·(θ1+θ01)}. The length of the resultant vector obtained by combining the two complex vectors represents the amplitude of the output (the inter-electrode electromotive force Eac), and an angle φ of the resultant vector represents the phase difference (phase delay) of the inter-electrode electromotive force Eac with respect to the phase ω0·t of the input (exciting current).

As is obvious from equation (21), a variation in ∂A/∂t component causes a variation in the zero point of the output of the electromagnetic flowmeter, and an error occurs in flow rate measurement.

The following embodiment will be described below based on the complex vector of the output in a basic arrangement shown in FIG. 2. Note that the flow rate is obtained by multiplying the flow velocity by the sectional area of the measuring tube. For this reason, generally, at calibration in an initial state, there is a one-to-one relationship between a flow velocity and a flow rate, and obtaining a flow velocity amounts to obtaining a flow rate. Hence, the method of obtaining the flow velocity will be described below (in order to obtain the flow rate).

The above definitions of θ00 and θ01 can be rephrased such that θ00 is the angle of the vector Va with respect to the imaginary axis, and θ01 is the angle of the vector Vb with respect to the real axis. Assume that the relationship between the angles θ00 and θ01 is defined as θ01=θ00+Δθ01, a state wherein an exciting angular frequency is ω0 is defined as the first excitation state, and an inter-electrode electromotive force Eac in the first excitation state is represented by E10. In this case, substituting θ01=θ00+Δθ01 into equation (21) yields the inter-electrode electromotive force E10 represented by the following equation:

$$E10 = rk \cdot \omega0 \cdot b1 \cdot \exp\{j \cdot (\pi/2 + \theta1 + \theta00)\} + \quad (22)$$
$$\gamma \cdot rk \cdot V \cdot b1 \cdot \exp\{j \cdot (\theta1 + \theta00 + \Delta\theta01)\}$$
$$= rk \cdot b1 \cdot \exp\{j \cdot (\theta1 + \theta00)\} \cdot$$
$$\{\omega0 \cdot \exp(j \cdot \pi/2) + \gamma \cdot V \cdot \exp(j \cdot \Delta\theta01)\}$$

In addition, if a state wherein the exciting angular frequency in the first excitation state has been changed from $\omega0$ to $\omega1$ is defined as the second excitation state, and the inter-electrode electromotive force Eac in the second excitation state is represented by E11, the inter-electrode electromotive force E11 is represented by the following equation according to equation (22).

$$E11 = rk \cdot b1 \cdot \exp\{j \cdot (\theta1+\theta00)\} \cdot \{\omega1 \cdot \exp(j \cdot \pi/2) + \gamma \cdot V \cdot \exp(j \cdot \Delta\theta01)\} \quad (23)$$

Figure 5A:
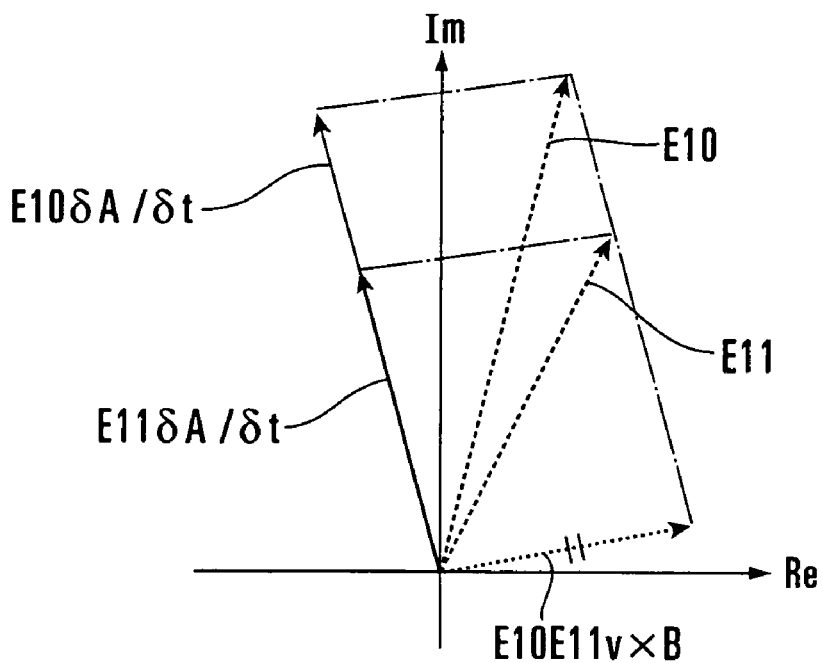
FIG. 5A is a view expressing inter-electrode electromotive forces in the form of complex vectors according to the first embodiment of the present invention.

FIG. 5A shows the inter-electrode electromotive forces E10 and E11 in the form of complex vectors. In FIG. 5A, E10∂A/∂t represents the ∂A/∂t component $rk \cdot b1 \cdot \exp\{j \cdot (\theta1+\theta00)\} \cdot \omega0 \cdot \exp(j \cdot \pi/2)$ of the inter-electrode electromotive force E10, and E11∂A/∂t represents the ∂A/∂t component $rk \cdot b1 \cdot \exp\{j \cdot (\theta1+\theta00)\} \cdot \omega1 \cdot \exp(j \cdot \pi/2)$ of the inter-electrode electromotive force E11. E10E11v×B represents the v×B component of each of the inter-electrode electromotive forces E10 and E11.

Letting EdA1 be the result obtained by multiplying the difference between the inter-electrode electromotive forces E10 and E11 by $\omega0/(\omega0-\omega1)$, equation (24) holds:

$$EdA1 = (E10 - E11) \cdot \omega0 / (\omega0 - \omega1) \quad (24)$$
$$= rk \cdot b1 \cdot \exp\{j \cdot (\theta1 + \theta00)\} \cdot$$
$$\frac{\left\{\begin{array}{l}\omega0 \cdot \exp(j \cdot \pi/2) + \gamma \cdot V \cdot \exp(j \cdot \Delta\theta01) - \\ \omega1 \cdot \exp(j \cdot \pi/2) - \gamma \cdot V \cdot \exp(j \cdot \Delta\theta01)\end{array}\right\} \cdot \omega0}{(\omega0 - \omega1)}$$
$$= [rk \cdot b1 \cdot \exp\{j \cdot (\pi/2 + \theta1 + \theta00)\}] \cdot \omega0$$

An electromotive force difference EdA1 represented by equation (24) is irrelevant to a magnitude V of the flow velocity, and hence is only the component generated by ∂A/∂t. The electromotive force difference EdA1 is used to extract the v×B component from the inter-electrode electromotive force E10 (the resultant vector Va+Vb). To be precise, the electromotive force difference EdA1 is the value obtained by multiplying the electromotive force difference between the inter-electrode electromotive forces E10 and E11 by $\omega0/(\omega0-\omega1)$. However, the reason why this electromotive force difference is multiplied by $\omega0/(\omega0-\omega1)$ is to facilitate the development of an equation.

Letting EvB1 be the v×B component obtained by subtracting the electromotive force difference EdA1 represented by equation (24) from the inter-electrode electromotive force E10 represented by equation (22), the v×B component EvB1 is represented by $$EvB1 = E10 - EdA1 \quad (25)$$
$$= rk \cdot b1 \cdot \exp\{j \cdot (\theta1 + \theta00)\} \cdot$$
$$\{\omega0 \cdot \exp(j \cdot \pi/2) + \gamma \cdot V \cdot \exp(j \cdot \Delta\theta01)\} -$$

-continued
$$[rk \cdot b1 \cdot \exp\{j \cdot (\pi/2 + \theta1 + \theta00)\}] \cdot \omega0$$
$$= [\gamma \cdot rk \cdot b1 \cdot \exp\{j \cdot (\theta1 + \theta00 + \Delta\theta01)\}] \cdot V$$

Figure 5B:
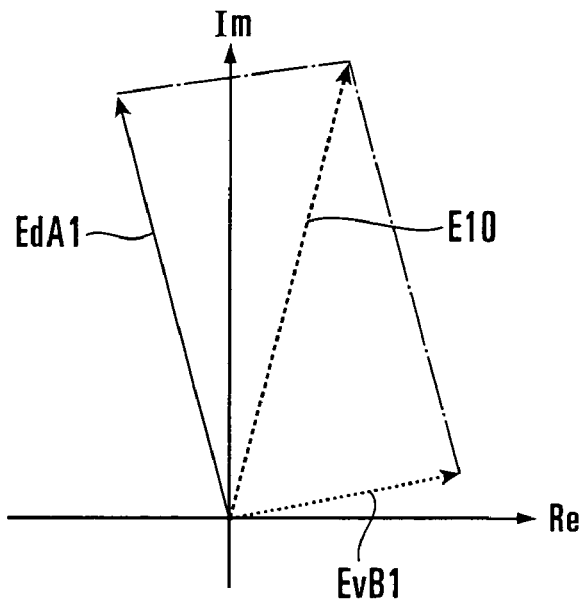
FIG. 5B is a view expressing an electromotive force difference and a v×B component in the form of complex vectors according to the first embodiment of the present invention.

The v×B component EvB1 is irrelevant to the angular frequency $\omega0$. If the magnitude V of the flow velocity is 0, the v×B component EvB1 is also 0. Accordingly, the output with the corrected zero point can be obtained based on the v×B component EvB1. FIG. 5B shows the electromotive force difference EdA1 and the v×B component EvB1 in the form of complex vectors. In equation (25), the magnitude and direction of a coefficient to be applied to the magnitude V of the flow velocity are represented by a complex vector $[\gamma \cdot rk \cdot b1 \cdot \exp\{j \cdot (\theta1+\theta00+\Delta\theta01)\}]$.

According to equation (25), the magnitude V of the flow velocity is expressed by $$V = |EvB1 / [\gamma \cdot rk \cdot b1 \cdot \exp\{j \cdot (\theta1 + \theta00 + \Delta\theta01)\}]| \quad (26)$$
$$= |EvB1| / (\gamma \cdot rk \cdot b1)$$

Table 1 shows the correspondence relationship between the constants and variables used in the basic principle described above and the constants and variables in this embodiment. As is obvious from Table 1, this embodiment is an example of specifically implementing the basic principle described above.

TABLE 1

Correspondence Relationship between Basic Principle and First Embodiment

| Constants and Variables in Basic Principle | Constants and Variables in First Embodiment |
|---|---|
| Va + Vb | E10 |
| Va' (= Va) | EdA1 |
| Vb | EvB1 |
| rω | rk · b1 |
| θω | π/2 + θ1 + θ00 |
| rv | γ · rk · b1 |
| θv | θ1 + θ00 + Δθ01 |

Figure 6:
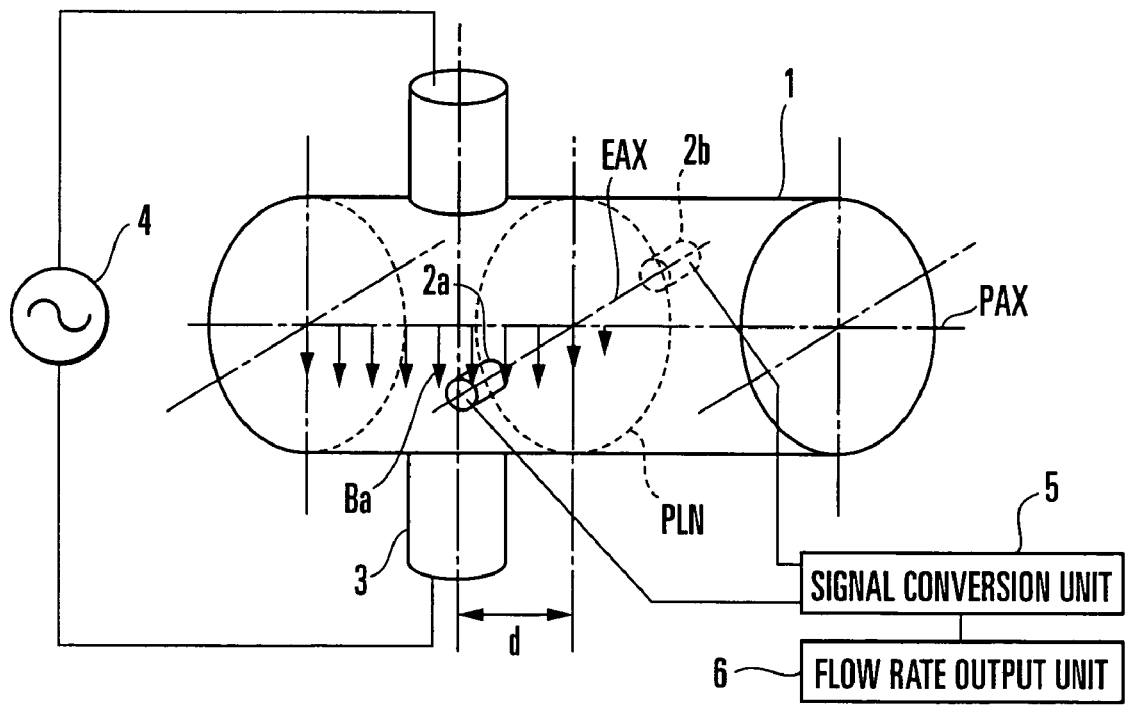
FIG. 6 is a block diagram showing the arrangement of the electromagnetic flowmeter according to the first embodiment of the present invention.

A specific arrangement of the electromagnetic flowmeter of this embodiment and its operation will be described next. FIG. 6 is a block diagram showing the arrangement of the electromagnetic flowmeter according to this embodiment. The same reference numerals as in FIG. 6 denote the same components in FIG. 2. The electromagnetic flowmeter according to this embodiment includes the measuring tube 1, the electrodes 2a and 2b, the exciting coil 3 placed at a position spaced apart by an offset distance d in the axial direction from a plane PLN which includes the electrodes 2a and 2b and is perpendicular to the direction of a measuring tube axis PAX, a power supply unit 4 which supplies an exciting current to the exciting coil 3, a signal conversion unit 5 which obtains the amplitudes and phases of resultant electromotive forces detected by the electrodes 2a and 2b in each of the first and second excitation states, and extracts the electromotive force difference between the resultant electromotive force in the first excitation state and the resultant electromotive force in the second excitation state as a ∂A/∂t component on the basis of the amplitudes and phases of the resultant electromotive forces, and a flow rate output unit 6 which extracts only the v×B component by removing the ∂A/∂t component from a resultant electromotive force in the first or second excitation state, and calculates the flow rate of the fluid based on the v×B component. The exciting coil 3 and the power supply unit 4 constitute an exciting unit which applies a time-changing magnetic field to the fluid to be measured.

The power supply unit 4 repeats, in a T-sec cycle, the operation of continuing the first excitation state for T0 sec in which an exciting current with an angular frequency ω0 is supplied to the exciting coil 3 and then continuing the second excitation state for T1 sec in which an exciting current with an angular frequency ω1 is supplied to the exciting coil 3. That is, T=T0+T1.

Figure 7:
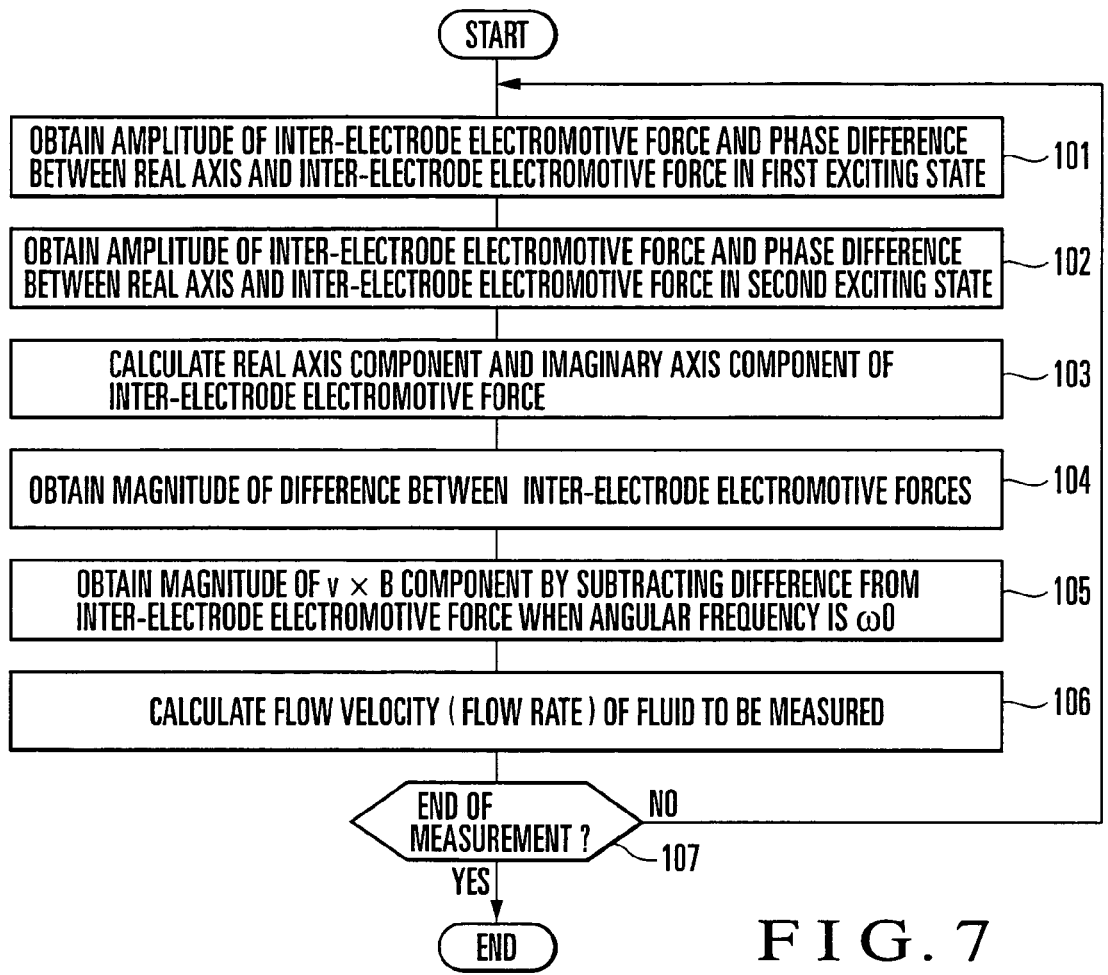
FIG. 7 is a flowchart showing the operations of a signal conversion unit and flow rate output unit according to the first embodiment of the present invention.

FIG. 7 is a flowchart showing the operations of the signal conversion unit 5 and flow rate output unit 6. First of all, the signal conversion unit 5 causes a phase detector (not shown) to obtain an amplitude r10 of the electromotive force E10 between the electrodes 2a and 2b in the first excitation state with the exciting angular frequency ω0, and obtain a phase difference φ10 between the real axis and the inter-electrode electromotive force E10 (step 101 in FIG. 7).

Subsequently, the signal conversion unit 5 causes the phase detector (not shown) to obtain an amplitude r11 of the electromotive force E11 between the electrodes 2a and 2b in the second excitation state with the exciting angular frequency ω1, and obtain a phase difference φ11 between the real axis and the inter-electrode electromotive force E11 (step 102).

The signal conversion unit 5 then calculates a real axis component E10x and imaginary axis component E10y of the inter-electrode electromotive force E10, and a real axis component E11x and imaginary axis component E11y of the inter-electrode electromotive force E11 according to the following equations (step 103):

$$E10x = r10 \cdot \cos(\phi 10) \tag{27}$$

$$E10y = r10 \cdot \sin(\phi 10) \tag{28}$$

$$E11x = r11 \cdot \cos(\phi 11) \tag{29}$$

$$E11y = r11 \cdot \sin(\phi 11) \tag{30}$$

After the calculation of equations (27) to (30), the signal conversion unit 5 obtains the magnitude of the electromotive force difference EdA1 between the inter-electrode electromotive forces E10 and E11 (step 104). The processing in step 104 corresponds to the processing of obtaining a ∂A/∂t component, and is equivalent to the calculation of equation (24). The signal conversion unit 5 calculates a real axis component EdA1x and imaginary axis component EdA1y of the electromotive force difference EdA1 according to the following equation:

$$EdA1x = (E10x - E11x) \cdot \omega 0/(\omega 0 - \omega 1) \tag{31}$$

$$EdA1y = (E10y - E11y) \cdot \omega 0/(\omega 0 - \omega 1) \tag{32}$$

The flow rate output unit 6 then obtains the magnitude of the v×B component EvB1 by removing the electromotive force difference EdA1 from the inter-electrode electromotive force E10 (step 105). The processing in step 105 is equivalent to the calculation of equation (25). The flow rate output unit 6 calculates a magnitude |EvB1| of the v×B component EvB1 according to the following equation:

$$|EvB1| = \{(E10x - EdA1x)^2 + (E10y - EdA1y)^2\}^{1/2} \tag{33}$$

The flow rate output unit 6 then calculates the magnitude V of the flow velocity of the fluid to be measured according to the following equation (step 106). The processing in step 106 is equivalent to the calculation of equation (26).

$$V = |EvB1|/rv \tag{34}$$

wherein a proportion coefficient rv is a constant which can be obtained in advance by calibration or the like. The signal conversion unit 5 and the flow rate output unit 6 perform the processing in steps 101 to 106 described above in a predetermined cycle until, for example, the end of the measurement is designated by the operator (YES in step 107).

As described above, this embodiment is configured to extract the electromotive force difference EdA1 (the vector Va of the ∂A/∂t component) from the inter-electrode electromotive forces E10 and E11 in the two excitation states with different exciting frequencies, extract the v×B component by removing the ∂A/∂t component from the inter-electrode electromotive force E10 (the resultant vector Va+Vb), and calculate, based on the v×B component, the flow rate of the fluid to be measured. Hence, the zero point of the output of the electromagnetic flowmeter can be corrected without setting the flow rate of a fluid to be measured to 0, and the stability of the zero point can be ensured even in high-frequency excitation.

In this embodiment, the v×B component is extracted by removing the ∂A/∂t component from the inter-electrode electromotive force E10 in the first exciting state. However, the v×B component may be extracted by removing the ∂A/∂t component from the inter-electrode electromotive force E11 in the second exciting state.

Second Embodiment

The second embodiment of the present invention will be described next. This embodiment uses the second extraction method as a method of extracting an estimated value Va' of a vector Va of a ∂A/∂t component, of the methods described in the basic principle, and is configured to apply magnetic fields based on a plurality of exciting frequencies to a fluid to be measured and extract the estimated value Va' of the vector Va of the ∂A/∂t component by using the difference between a plurality of frequency components contained in an inter-electrode electromotive force. The arrangement of the electromagnetic flowmeter of this embodiment is the same as that of the electromagnetic flowmeter according to the first embodiment shown in FIG. 6. Therefore, the principle of this embodiment will be described by using the same reference numerals as in FIG. 6.

Referring to FIG. 6, assume that a magnetic field component (magnetic flux density) B2, of the magnetic field generated from an exciting coil 3, which is orthogonal to both an electrode axis EAX connecting electrodes 2a and 2b and a measuring tube axis PAX on the electrode axis EAX is given by $$B2 = b2 \cdot \cos(\omega 0 \cdot t - \theta 2) + b2 \cdot \cos(\omega 1 \cdot t - \theta 2) \tag{35}$$

In equation (35), ω0 and ω1 are different angular frequencies, b2 is the amplitudes of component, of the magnetic flux densities B2, which have the angular frequencies ω0 and ω1, and θ2 is phase differences (phase lags) between the components with the angular frequency ω0 and ω0·t and between the components with the angular frequency ω1 and ω1·t.

Letting E20c be the electromotive force based on the component with the angular frequency ω0 of an overall inter-electrode electromotive force obtained by combining the electromotive force obtained by converting the inter-electrode electromotive force originating from a temporal change in magnetic field into a complex vector and the electromotive force obtained by converting the inter-electrode electromotive force originating from the flow velocity of the fluid to be measured into a complex vector, the inter-electrode electromotive force E20c is expressed by the following equation similar to equation (21).

$$E20c = rk \cdot \omega 0 \cdot b2 \cdot \exp\{j \cdot (\pi/2 + \theta 2 + \theta 00)\} + \gamma \cdot rk \cdot b2 \cdot \exp\{j \cdot (\theta 2 + \theta 01)\} \quad (36)$$

Letting E21c be the electromotive force based on the component with the angular frequency ω1 of an overall inter-electrode electromotive force obtained by combining the electromotive force obtained by converting the inter-electrode electromotive force originating from a temporal change in magnetic field into a complex vector and the electromotive force obtained by converting the inter-electrode electromotive force originating from the flow velocity of the fluid to be measured into a complex vector, the inter-electrode electromotive force E21c is expressed by the following equation similar to equation (21):

$$E21c = rk \cdot \omega 1 \cdot b2 \cdot \exp\{j \cdot (\pi/2 + \theta 2 + \theta 00)\} + \gamma \cdot rk \cdot b2 \cdot \exp\{j \cdot (\theta 2 + \theta 01)\} \quad (37)$$

Assume that $\theta 01 = \theta 00 + \Delta\theta 01$ represents the relationship between an angle θ00 of the vector Va with respect to the imaginary axis and an angle θ01 of the vector Vb with respect to the real axis. In this case, letting E20 be an electromotive force E20c obtained when $\theta 01 = \theta 00 + \Delta\theta 01$ is substituted into equation (36), E20 is given by $$\begin{aligned} E20 &= rk \cdot \omega 0 \cdot b2 \cdot \exp\{j \cdot (\pi/2 + \theta 2 + \theta 00)\} + \\ &\quad \gamma \cdot rk \cdot V \cdot b2 \cdot \exp\{j \cdot (\theta 2 + \theta 00 + \Delta\theta 01)\} \\ &= rk \cdot b2 \cdot \exp\{j \cdot (\theta 2 + \theta 00)\} \cdot \\ &\quad \{\omega 0 \cdot \exp(j \cdot \pi/2) + \gamma \cdot V \cdot \exp(j \cdot \Delta\theta 01)\} \end{aligned} \quad (38)$$

Likewise, letting E21 be an electromotive force E21c obtained when $\theta 01 = \theta 00 + \Delta\theta 01$ is substituted into equation (37), E21 is given by $$\begin{aligned} E21 &= rk \cdot \omega 1 \cdot b2 \cdot \exp\{j \cdot (\pi/2 + \theta 2 + \theta 00)\} + \\ &\quad \gamma \cdot rk \cdot V \cdot b2 \cdot \exp\{j \cdot (\theta 2 + \theta 00 + \Delta\theta 01)\} \\ &= rk \cdot b2 \cdot \exp\{j \cdot (\theta 2 + \theta 00)\} \cdot \\ &\quad \{\omega 1 \cdot \exp(j \cdot \pi/2) + \gamma \cdot V \cdot \exp(j \cdot \Delta\theta 01)\} \end{aligned} \quad (39)$$

Figure 8A:
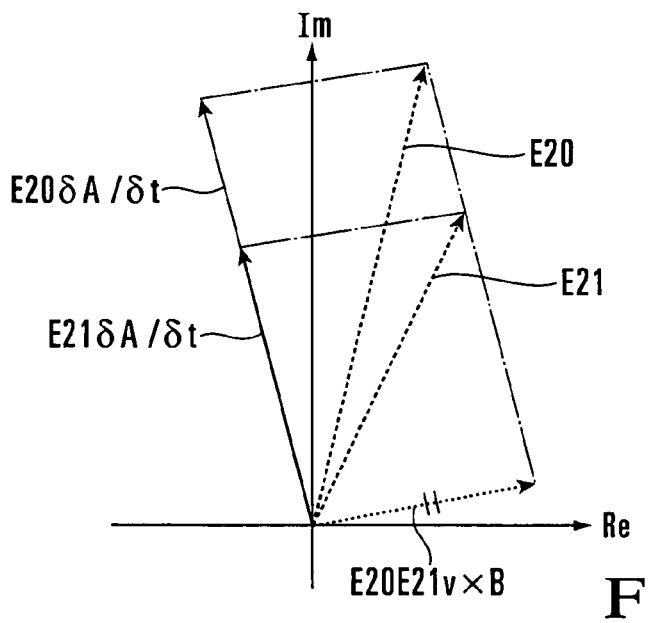
FIG. 8A is a view expressing inter-electrode electromotive forces in the form of complex vectors according to the second embodiment of the present invention.

FIG. 8A shows the inter-electrode electromotive forces E20 and E21 in the form of complex vectors. In FIG. 8A, E20∂A/∂t represents the ∂A/∂t component $rk \cdot b2 \cdot \exp\{j \cdot (\theta 2 + \theta 00)\} \cdot \omega 0 \cdot \exp(j \cdot \pi/2)$ of the inter-electrode electromotive force E20, and E21∂A/∂t represents the ∂A/∂t component $rk \cdot b2 \cdot \exp\{j \cdot (\theta 2 + \theta 00)\} \cdot \omega 1 \cdot \exp(j \cdot \pi/2)$ of the inter-electrode electromotive force E21. E20E21v×B represents the v×B component of each of the inter-electrode electromotive forces E20 and E21. Letting EdA2 be the result obtained by multiplying the difference between the inter-electrode electromotive forces E20 and E21 by ω0/(ω0−ω1), equation (40) holds:

$$\begin{aligned} EdA2 &= (E20 - E21) \cdot \omega 0 / (\omega 0 - \omega 1) \\ &= rk \cdot b2 \cdot \exp\{j \cdot (\theta 2 + \theta 00)\} \cdot \\ &\quad \frac{\left\{\begin{array}{l} \omega 0 \cdot \exp(j \cdot \pi/2) + \gamma \cdot V \cdot \exp(j \cdot \Delta\theta 01) - \\ \omega 1 \cdot \exp(j \cdot \pi/2) - \gamma \cdot V \cdot \exp(j \cdot \Delta\theta 01) \end{array}\right\} \cdot \omega 0}{(\omega 0 - \omega 1)} \\ &= [rk \cdot b2 \cdot \exp\{j \cdot (\pi/2 + \theta 2 + \theta 00)\}] \cdot \omega 0 \end{aligned} \quad (40)$$

An electromotive force difference EdA2 represented by equation (40) is irrelevant to a magnitude V of the flow velocity, and hence is only the component generated by ∂A/∂t. The electromotive force difference EdA2 is used to extract the v×B component from the inter-electrode electromotive force E20 (the resultant vector Va+Vb). To be precise, the electromotive force difference EdA2 is the value obtained by multiplying the electromotive force difference between the inter-electrode electromotive forces E20 and E21 by ω0/(ω0−ω1). However, the reason why this electromotive force difference is multiplied by ω0/(ω0−ω1) is to facilitate the development of an equation.

Letting EvB2 be the v×B component obtained by subtracting the electromotive force difference EdA2 represented by equation (40) from the inter-electrode electromotive force E20 represented by equation (38), the v×B component EvB2 is represented by $$\begin{aligned} EvB2 &= E20 - EdA2 \\ &= rk \cdot b2 \cdot \exp\{j \cdot (\theta 2 + \theta 00)\} \cdot \\ &\quad \{\omega 0 \cdot \exp(j \cdot \pi/2) + \gamma \cdot V \cdot \exp(j \cdot \Delta\theta 01)\} - \\ &\quad [rk \cdot b2 \cdot \exp\{j \cdot (\pi/2 + \theta 2 + \theta 00)\} \cdot \omega 0] \\ &= [\gamma \cdot rk \cdot b2 \cdot \exp\{j \cdot (\theta 2 + \theta 00 + \Delta\theta 01)\}] \cdot V \end{aligned} \quad (41)$$

Figure 8B:
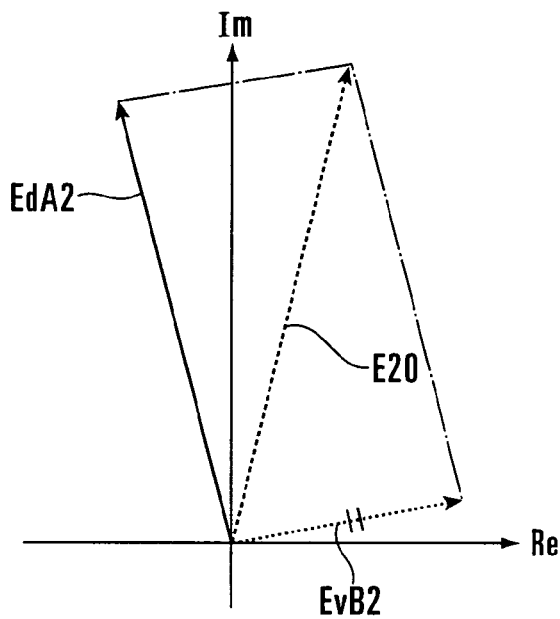
FIG. 8B is a view expressing an electromotive force difference and a v×B component in the form of complex vectors according to the second embodiment of the present invention.

The v×B component EvB2 is irrelevant to the angular frequencies ω0 and ω1. If the magnitude V of the flow velocity is 0, the v×B component EvB2 is also 0. Accordingly, the output with the corrected zero point can be obtained based on the v×B component EvB2. FIG. 8B shows the electromotive force difference EdA2 and the v×B component EvB2 in the form of complex vectors. In equation (41), the magnitude and direction of a coefficient to be applied to the magnitude V of the flow velocity are represented by a complex vector $[\gamma \cdot rk \cdot b2 \cdot \exp\{j \cdot (\theta 2 + \theta 00 + \Delta\theta 01)\}]$.

According to equation (41), the magnitude V of the flow velocity is expressed by $$\begin{aligned} V &= |EvB2 / [\gamma \cdot rk \cdot b2 \cdot \exp\{j \cdot (\theta 2 + \theta 00 + \Delta\theta 01)\}]| \\ &= |EvB2| / (\gamma \cdot rk \cdot b2) \end{aligned} \quad (42)$$

Table 2 shows the correspondence relationship between the constants and variables used in the basic principle described above and the constants and variables in this embodiment. As is obvious from Table 2, this embodiment is an example of specifically implementing the basic principle described above.

TABLE 2

Correspondence Relationship between Basic Principle and Second Embodiment

| Constants and Variables in Basic Principle | Constants and Variables in Second Embodiment |
|---|---|
| Va + Vb | E20 |
| Va' (= Va) | EdA2 |
| Vb | EvB2 |
| rω | rk · b2 |
| θω | π/2 + θ2 + θ00 |
| rv | γ · rk · b2 |
| θv | θ2 + θ00 + Δθ01 |

A specific arrangement of the electromagnetic flowmeter of this embodiment and its operation will be described next. As described above, the arrangement of the electromagnetic flowmeter of this embodiment is the same as that in FIG. 6, and hence the electromagnetic flowmeter of this embodiment will be described by using the reference numerals in FIG. 6. The electromagnetic flowmeter of this embodiment includes a measuring tube 1, the electrodes 2a and 2b, the exciting coil 3, a power supply unit 4, a signal conversion unit 5 which obtains amplitudes and phases of two frequency components with the first frequency $\omega 0$ and the second frequency $\omega 1$ of the resultant electromotive force detected by the electrodes 2a and 2b, and extracts the electromotive force difference between the two frequency components as the $\partial A/\partial t$ component on the basis of the amplitudes and the phases, and a flow rate output unit 6 which extracts only the v×B component by removing the $\partial A/\partial t$ component from the frequency $\omega 0$ component of the resultant electromotive force, and calculates the flow rate of the fluid based on the v×B component.

The power supply unit 4 supplies, to the exciting coil 3, an exciting current containing the sine wave components with the first angular frequency $\omega 0$ and the second angular frequency $\omega 1$. In this case, the amplitudes of the angular frequency $\omega 0$ component and the angular frequency $\omega 1$ component in the exciting current are the same.

Figure 9:
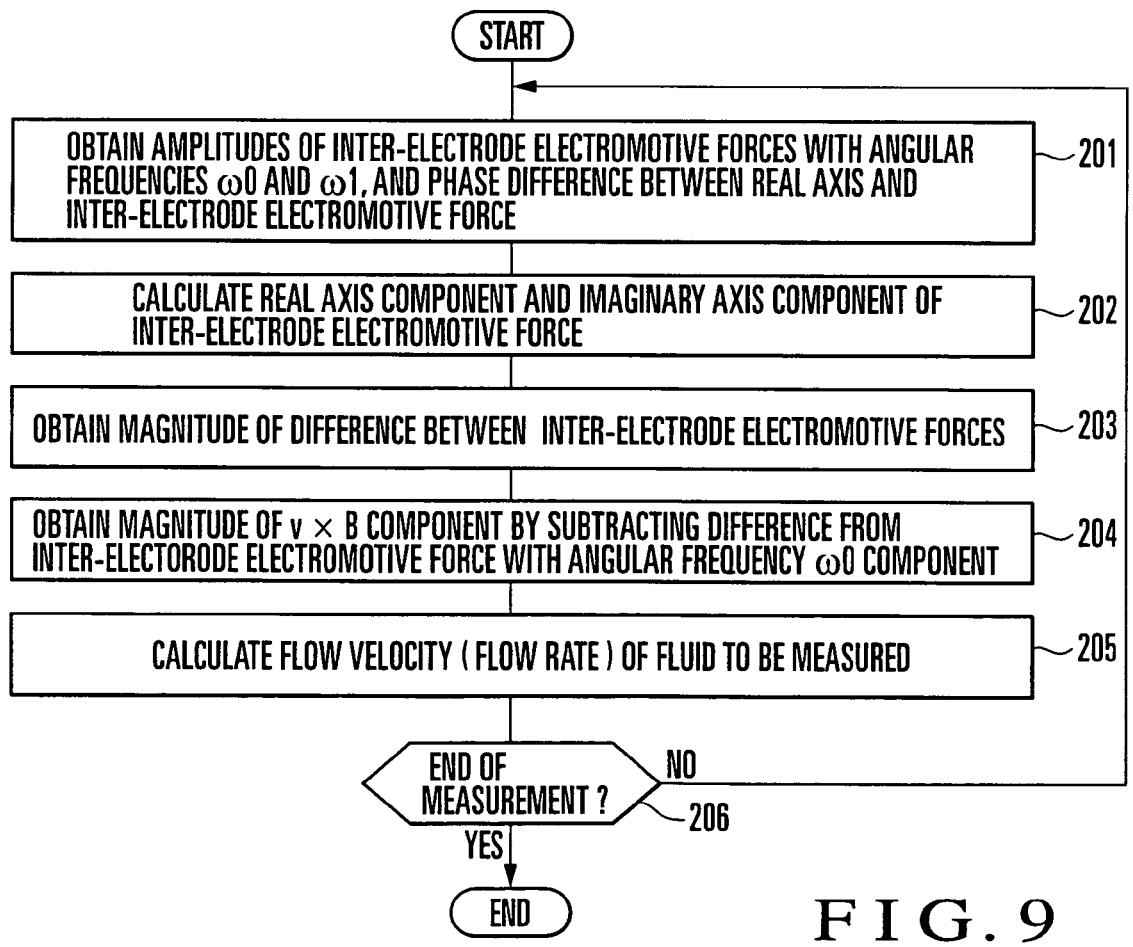
FIG. 9 is a flowchart showing the operations of a signal conversion unit and flow rate output unit according to the second embodiment of the present invention.

FIG. 9 is a flowchart showing the operations of the signal conversion unit 5 and flow rate output unit 6. First of all, the signal conversion unit 5 causes a phase detector (not shown) to obtain an amplitude r20 of the electromotive force E20 with the angular frequency $\omega 0$ component of the electromotive force between the electrodes 2a and 2b, and obtain a phase difference $\phi 20$ between the real axis and the inter-electrode electromotive force E20. Subsequently, the signal conversion unit 5 causes the phase detector to obtain an amplitude r21 of the electromotive force E21 with the angular frequency $\omega 1$ component of the electromotive force between the electrodes 2a and 2b, and obtain a phase difference $\phi 21$ between the real axis and the inter-electrode electromotive force E21 (step 201 in FIG. 9). The inter-electrode electromotive forces E20 and E21 can also separate the frequency by a bandpass filter. However, actually, they can easily separate the frequency into two angular frequency components $\omega 0$ and $\omega 1$ by using a comb-shaped digital filter called a "comb filter".

The signal conversion unit 5 then calculates a real axis component E20x and imaginary axis component E20y of the inter-electrode electromotive force E20, and a real axis component E21x and imaginary axis component E21y of the inter-electrode electromotive force E21 according to the following equations (step 202):

$$E20x = r20 \cdot \cos(\phi 20) \quad (43)$$

$$E20y = r20 \cdot \sin(\phi 20) \quad (44)$$

$$E21x = r21 \cdot \cos(\phi 21) \quad (45)$$

$$E21y = r21 \cdot \sin(\phi 21) \quad (46)$$

After the calculation of equations (43) to (46), the signal conversion unit 5 obtains the magnitude of the electromotive force difference EdA2 between the inter-electrode electromotive forces E20 and E21 (step 203). The processing in step 203 corresponds to the processing of obtaining a $\partial A/\partial t$ component, and is equivalent to the calculation of equation (40). The signal conversion unit 5 calculates a real axis component EdA2x and imaginary axis component EdA2y of the electromotive force difference EdA2 according to the following equation:

$$EdA2x = (E20x - E21x) \cdot \omega 0/(\omega 0 - \omega 1) \quad (47)$$

$$EdA2y = (E20y - E21y) \cdot \omega 0/(\omega 0 - \omega 1) \quad (48)$$

The flow rate output unit 6 then obtains the magnitude of the v×B component EvB2 by removing the electromotive force difference EdA2 from the inter-electrode electromotive force E20 (step 204). The processing in step 204 is equivalent to the calculation of equation (41). The flow rate output unit 6 calculates a magnitude |EvB2| of the v×B component EvB2 according to the following equation:

$$|EvB2| = \{(E20x - EdA2x)^2 + (E20y - EdA2y)^2\}^{1/2} \quad (49)$$

The flow rate output unit 6 then calculates the magnitude V of the flow velocity of the fluid to be measured according to the following equation (step 205). The processing in step 205 is equivalent to the calculation of equation (42).

$$V = |EvB2|/rv \quad (50)$$

wherein a proportion coefficient rv is a constant which can be obtained in advance by calibration or the like. The signal conversion unit 5 and the flow rate output unit 6 perform the processing in steps 201 to 205 described above in a predetermined cycle until, for example, the end of the measurement is designated by the operator (YES in step 206).

As described above, this embodiment is configured to apply the magnetic field with two components having the same magnitude but different frequencies, from the excitation coil 3 to the fluid to be measured, extract the electromotive force difference EdA2 (the $\partial A/\partial t$ component vector Va) between the electromotive force E20 with the angular frequency $\omega 0$ component and the electromotive force E21 with the angular frequency $\omega 1$ component of the electromotive force between the electrodes 2a and 2b, extract the v×B component by removing the $\partial A/\partial t$ component from the inter-electrode electromotive force E20 (the resultant vector Va+Vb), and calculate, based on the v×B component, the flow rate of the fluid to be measured. Hence, the zero point of the output of the electromagnetic flowmeter can be corrected without setting the flow rate of a fluid to be measured to 0, and the stability of the zero point can be ensured even in high-frequency excitation.

In this embodiment, there is no need to switch the exciting frequency as in the first embodiment. Hence, the flow rate can be calculated at higher speed. In this embodiment, the v×B component is extracted by removing the ∂A/∂t component from the electromotive force E20 with the angular frequency ω0 component. However, the v×B component may be extracted by removing the ∂A/∂t component from the electromotive force E21 with the angular frequency ω1 component.

Third Embodiment

The third embodiment of the present invention will be described next. This embodiment uses the second extraction method as a method of extracting an estimated value Va' of a vector Va of a ∂A/∂t component, of the methods described in the basic principle, and is configured to apply amplitude-modulated magnetic fields to a fluid to be measured and extract the estimated value Va' of the vector Va of the ∂A/∂t component by using the difference between a plurality of frequency components contained in an inter-electrode electromotive force. The arrangement of the electromagnetic flowmeter of this embodiment is the same as that of the electromagnetic flowmeter according to the first embodiment shown in FIG. 6. Therefore, the principle of this embodiment will be described by using the same reference numerals as in FIG. 6.

Referring to FIG. 6, assume that a magnetic field component (magnetic flux density) B3, of the magnetic field generated from an exciting coil 3, which is orthogonal to both an electrode axis EAX connecting electrodes 2a and 2b and a measuring tube axis PAX on the electrode axis EAX is given by $$B3 = b3 \cdot \{1 + ma \cdot \cos(\omega 1 \cdot t)\} \cdot \cos(\omega 0 \cdot t - \theta 3) \tag{51}$$

In equation (51), b3 is the amplitude of the magnetic field B3, ω0 is the angular frequency of a carrier wave, ω1 is the angular frequency of a modulation wave, θ3 is the phase difference (phase delay) between the carrier wave and ω0·t, and ma is an amplitude modulation index. A magnetic flux density B3 will be referred to as the magnetic field B3 hereinafter.

Equation (51) can be rewritten into the following equation:

$$\begin{aligned} B3 &= b3 \cdot \{1 + ma \cdot \cos(\omega 1 \cdot t)\} \cdot \cos(\omega 0 \cdot t - \theta 3) \\ &= b3 \cdot \cos(\theta 3) \cdot \cos(\omega 0 \cdot t) + \\ &\quad b3 \cdot \sin(\theta 3) \cdot \sin(\omega 0 \cdot t) + \\ &\quad (1/2) \cdot ma \cdot b3 \cdot \cos(\theta 3) \cdot \cos\{(\omega 0 + \omega 1) \cdot t\} + \\ &\quad (1/2) \cdot ma \cdot b3 \cdot \sin(\theta 3) \cdot \sin\{(\omega 0 + \omega 1) \cdot t\} + \\ &\quad (1/2) \cdot ma \cdot b3 \cdot \cos(\theta 3) \cdot \cos\{(\omega 0 - \omega 1) \cdot t\} + \\ &\quad (1/2) \cdot ma \cdot b3 \cdot \sin(\theta 3) \cdot \sin\{(\omega 0 - \omega 1) \cdot t\} \end{aligned} \tag{52}$$

An inter-electrode electromotive force which originates from a change in magnetic field and is irrelevant to the flow velocity of a fluid to be measured will be described first. Since the electromotive force originating from the change in magnetic field depends on a time derivative dB/dt of the magnetic field, and hence the magnetic field B3 generated by the exciting coil 3 is differentiated according to $$\begin{aligned} dB3/dt &= \\ &\omega 0 \cdot b3 \{\sin(\theta 3)\} \cdot \cos(\omega 0 \cdot t) + \omega 0 \cdot b3 \cdot \{-\cos(\theta 3)\} \cdot \sin(\omega 0 \cdot t) + \\ &(1/2) \cdot ma \cdot (\omega 0 + \omega 1) \cdot b3 \cdot \{\sin(\theta 3)\} \cdot \cos\{(\omega 0 + \omega 1) \cdot t\} + \\ &(1/2) \cdot ma \cdot (\omega 0 + \omega 1) \cdot b3 \cdot \{-\cos(\theta 3)\} \cdot \sin\{(\omega 0 + \omega 1) \cdot t\} + \\ &(1/2) \cdot ma \cdot (\omega 0 - \omega 1) \cdot b3 \cdot \{\sin(\theta 3)\} \cdot \cos\{(\omega 0 - \omega 1) \cdot t\} + \\ &(1/2) \cdot ma \cdot (\omega 0 - \omega 1) \cdot b3 \cdot \{-\cos(\theta 3)\} \cdot \sin\{(\omega 0 - \omega 1) \cdot t\} \end{aligned} \tag{53}$$

If the flow velocity of the fluid to be measured is 0, a generated eddy current I is directed as shown in FIG. 3 as in the first embodiment. Therefore, an inter-electrode electromotive force E which is generated by a change in the magnetic field Ba and is irrelevant to the flow velocity is directed as shown in FIG. 3 within a plane including the electrode axis EAX and the measuring tube axis PAX.

At this time, the inter-electrode electromotive force E is the value obtained by multiplying each of the angular frequency components ω0, (ω0−ω1), and (ω0+ω1) of a time derivative −dB3/dt of a magnetic field whose direction is taken into consideration by a proportion coefficient rk, and substituting θ3+θ00 into the phase θ3 (rk and θ00 are associated with the conductivity and permittivity of the fluid to be measured and the structure of the measuring tube 1 including the arrangement of the electrodes 2a and 2b), as indicated by the following equation:

$$\begin{aligned} E &= rk \cdot \omega 0 \cdot b3 \cdot \{-\sin(\theta 3 + \theta 00)\} \cdot \cos(\omega 0 \cdot t) + rk \cdot \\ &\quad \omega 0 \cdot b3 \cdot \{\cos(\theta 3 + \theta 00)\} \cdot \sin(\omega 0 \cdot t) + (1/2) \cdot ma \cdot rk \cdot \\ &\quad (\omega 0 + \omega 1) \cdot b3 \cdot \{-\sin(\theta 3 + \theta 00)\} \cdot \cos\{(\omega 0 + \omega 1) \cdot t\} + \\ &\quad (1/2) \cdot ma \cdot rk \cdot (\omega 0 + \omega 1) \cdot b3 \cdot \{\cos(\theta 3 + \theta 00)\} \cdot \sin\{(\omega 0 + \omega 1) \cdot t\} + \\ &\quad (1/2) \cdot ma \cdot rk \cdot (\omega 0 - \omega 1) \cdot b3 \cdot \\ &\quad \{-\sin(\theta 3 + \theta 00)\} \cdot \cos\{(\omega 0 - \omega 1) \cdot t\} + \\ &\quad (1/2) \cdot ma \cdot rk \cdot (\omega 0 - \omega 1) \cdot b3 \cdot \{\cos(\theta 3 + \theta 00)\} \cdot \sin\{(\omega 0 - \omega 1) \cdot t\} \end{aligned} \tag{54}$$

The inter-electrode electromotive force originating from the flow velocity of the fluid to be measured will be described next. Letting V (V≠0) be the magnitude of the flow velocity of the fluid, since a component v×Ba originating from a flow velocity vector v of the fluid to be measured is generated in a generated eddy current in addition to the eddy current I when the flow velocity is 0, an eddy current Iv generated by the flow velocity vector v and the magnetic field Ba is directed as shown in FIG. 4 as in the first embodiment. In this case, as indicated by the following equation, the inter-electrode electromotive force Ev originating from the flow velocity is the value obtained by multiplying each of the angular frequency components ω0, (ω0−ω1), and (ω0+1) of the magnetic field B3 by a proportion coefficient rkv, and substituting θ3+θ01 into the phase θ3 (rkv and θ01 are associated with a magnitude V of the flow velocity, the conductivity and permittivity of the fluid to be measured, and the structure of the measuring tube 1 including the arrangement of the electrodes 2a and 2b), as indicated by the following equation:

$$Ev = rkv \cdot b3 \cdot \{\cos(\omega 3 + \theta 01)\} \cdot \cos(\omega 0 \cdot t) + \qquad (55)$$
$$rkv \cdot b3 \cdot \{\sin(\omega 3 + \theta 01)\} \cdot \sin(\omega 0 \cdot t) +$$
$$(1/2) \cdot ma \cdot rkv \cdot b3 \cdot \{\cos(\theta 3 + \theta 01)\} \cdot \cos\{(\omega 0 + \omega 1) \cdot t\} +$$
$$(1/2) \cdot ma \cdot rkv \cdot b3 \cdot \{\sin(\theta 3 + \theta 01)\} \cdot \sin\{(\omega 0 + \omega 1) \cdot t\} +$$
$$(1/2) \cdot ma \cdot rkv \cdot b3 \cdot \{\cos(\theta 3 + \theta 01)\} \cdot \cos\{(\omega 0 - \omega 1) \cdot t\} +$$
$$(1/2) \cdot ma \cdot rkv \cdot b3 \cdot \{\sin(\theta 3 + \theta 01)\} \cdot \sin\{(\omega 0 - \omega 1) \cdot t\}$$

Of an overall inter-electrode electromotive force obtained by combining the electromotive force obtained by converting the inter-electrode electromotive force E represented by equation (54) into a complex vector and the electromotive force obtained by converting the inter-electrode electromotive force Ev represented by equation (54) into a complex vector, an electromotive force Ea30c with the angular frequency ω0 component is expressed by the first and second terms of equation (54), the first and second terms of equation (55), and equation (20).

$$Ea30c = rk \cdot \omega 0 \cdot b3 \cdot \exp\{j \cdot (\pi/2 + \theta 3 + \theta 00)\} + \gamma \cdot rk \cdot V \cdot b3 \cdot \exp\{j \cdot (\theta 3 + \theta 01)\} \qquad (56)$$

Of the overall inter-electrode electromotive force obtained by combining the electromotive force obtained by converting the inter-electrode electromotive force E into a complex vector and the electromotive force obtained by converting the inter-electrode electromotive force Ev into a complex vector, an electromotive force Ea3pc with an angular frequency (ω0 +ω1) component is expressed by applying the third and fourth terms of equation (54), the third and fourth terms of equation (55), and equation (20).

$$Ea3pc = (1/2) \cdot ma \cdot rk \cdot (\omega 0 + \omega 1) \cdot b3 \cdot \qquad (57)$$
$$\exp[j \cdot (\pi/2 + \theta 3 + \theta 00)] +$$
$$(1/2) \cdot ma \cdot \gamma \cdot rk \cdot V \cdot b3 \cdot$$
$$\exp\{j \cdot (\theta 3 + \theta 01)\}$$

Of the overall inter-electrode electromotive force obtained by combining the electromotive force obtained by converting the inter-electrode electromotive force E into a complex vector and the electromotive force obtained by converting the inter-electrode electromotive force Ev into a complex vector, an electromotive force Ea3mc with an angular frequency (ω0−ω1) component is expressed by applying the fifth and sixth terms of equation (54), the fifth and sixth terms of equation (55), and equation (20).

$$Ea3mc = (1/2) \cdot ma \cdot rk \cdot (\omega 0 - \omega 1) \cdot b3 \cdot \qquad (58)$$
$$\exp\{j \cdot (\pi/2 + \theta 3 + \theta 00)\} +$$
$$(1/2) \cdot ma \cdot \gamma \cdot rk \cdot V \cdot b3 \cdot$$
$$\exp\{j \cdot (\theta 3 + \theta 01)\}$$

Assume that $\theta 01 = \theta 00 + \Delta\theta 01$ represents the relationship between an angle $\theta 00$ of the vector Va with respect to the imaginary axis and an angle $\theta 01$ of the vector Vb with respect to the real axis. In this case, letting E30 be the electromotive force Ea30c obtained by substituting $\theta 01 = \theta 00 + \Delta\theta 01$ into equation (56), E30 is given by $$E30 = rk \cdot \omega 0 \cdot b3 \cdot \exp\{j(\pi/2 + \theta 3 + \theta 00)\} + \qquad (59)$$
$$\gamma \cdot rk \cdot V \cdot b3 \cdot \exp\{j \cdot (\theta 3 + \theta 00 + \Delta\theta 01)\}$$
$$= rk \cdot b3 \cdot \exp\{j \cdot (\theta 3 + \theta 00)\} \cdot$$
$$\{\omega 0 \cdot \exp(j \cdot \pi/2) + \gamma \cdot V \cdot \exp(j \cdot \Delta\theta 01)\}$$

Letting E3p be the electromotive force Ea3pc obtained by substituting $\theta 01 = \theta 00 + \Delta\theta 01$ into equation (57), E3p is represented as follows:

$$E3p = (1/2) \cdot ma \cdot rk \cdot (\omega 0 + \omega 1) \cdot b3 \cdot \qquad (60)$$
$$\exp\{j \cdot (\pi/2 + \theta 3 + \theta 00)\} +$$
$$(1/2) \cdot ma \cdot \gamma \cdot rk \cdot V \cdot b3 \cdot$$
$$\exp\{j \cdot (\theta 3 + \theta 00 + \Delta\theta 01)\}$$
$$= (1/2) \cdot ma \cdot rk \cdot b3 \cdot \exp\{j \cdot (\theta 3 + \theta 00)\} \cdot$$
$$\{(\omega 0 + \omega 1) \cdot \exp(j \cdot \pi/2) + \gamma \cdot V \cdot \exp(j \cdot \Delta\theta 01)\}$$

Similarly, letting E3m be the electromotive force Ea3mc obtained by substituting $\theta 01 = \theta 00 + \Delta\theta 01$ into equation (58), E3m is represented as follows:

$$E3m = (1/2) \cdot ma \cdot rk \cdot (\omega 0 - \omega 1) \cdot b3 \cdot \qquad (61)$$
$$\exp\{j \cdot (\pi/2 + \theta 3 + \theta 00)\} +$$
$$(1/2) \cdot ma \cdot \gamma \cdot rk \cdot V \cdot b3 \cdot$$
$$\exp\{j \cdot (\theta 3 + \theta 01)\}$$
$$= (1/2) \cdot ma \cdot rk \cdot b3 \cdot \exp\{j \cdot (\theta 3 + \theta 00)\} \cdot$$
$$\{(\omega 0 - \omega 1) \cdot \exp(j \cdot \pi/2) + \gamma \cdot V \cdot \exp(j \cdot \Delta\theta 01)\}$$

Figure 10A:
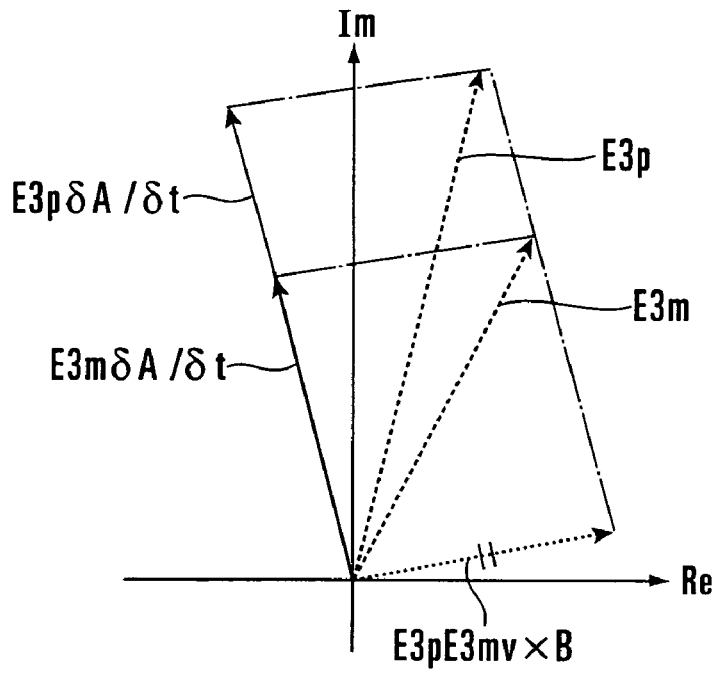
FIG. 10A is a view expressing inter-electrode electromotive forces in the form of complex vectors according to the third embodiment of the present invention.

FIG. 10A shows the inter-electrode electromotive forces E3p and E3m in the form of complex vectors. In FIG. 10A, E3p∂A/∂t represents the ∂A/∂t component $(1/2) \cdot ma \cdot rk \cdot b3 \cdot \exp\{j \cdot (\pi/2 + \theta 3 + \theta 00)\} \cdot (\omega 0 + \omega 1)$ of the inter-electrode electromotive force E3p, and E3m∂A/∂t represents the ∂A/∂t component $(1/2) \cdot ma \cdot rk \cdot b3 \cdot \exp\{j \cdot (\pi/2 + \theta 3 + \theta 00)\} \cdot (\omega 0 - \omega 1)$ of the inter-electrode electromotive force E3m. E3pE3mv×B represents the v×B component of each of the inter-electrode electromotive forces E3p and E3m. Letting EdA3 be the result obtained by multiplying the difference between the inter-electrode electromotive forces E3p and E3m by ω0/ω1·(1/ma), equation (62) holds:

$$EdA3 = (E3p - E3m) \cdot (\omega 0/\omega 1) \cdot (1/ma) \qquad (62)$$
$$= (1/2) \cdot ma \cdot rk \cdot b3 \cdot \exp\{j \cdot (\theta 3 + \theta 00)\} \cdot$$
$$\begin{Bmatrix} (\omega 0 + \omega 1) \cdot \exp(j \cdot \pi/2) + \\ \gamma \cdot V \cdot \exp(j \cdot \Delta\theta 01) - \\ (\omega 0 - \omega 1) \cdot \exp(j \cdot \pi/2) - \\ \gamma \cdot V \cdot \exp(j \cdot \Delta\theta 01) \end{Bmatrix} \cdot (\omega 0/\omega 1) \cdot (1/ma)$$
$$= [rk \cdot b3 \cdot \exp\{j \cdot (\pi/2 + \theta 3 + \theta 00)\}] \cdot \omega 0$$

An electromotive force difference EdA3 represented by equation (62) is irrelevant to a magnitude V of the flow velocity, and hence is only the component generated by $\partial A/\partial t$. The electromotive force difference EdA3 is used to extract the v×B component from the inter-electrode electromotive force E30 (the resultant vector Va+Vb). To be precise, the electromotive force difference EdA3 is the value obtained by multiplying the electromotive force difference between the inter-electrode electromotive forces E3$p$ and E3$m$ by $(\omega 0/\omega 1)\cdot(1/ma)$. However, the reason why this electromotive force difference is multiplied by $(\omega 0/\omega 1)\cdot(1/ma)$ is to facilitate the development of an equation.

Letting EvB3 be the v×B component obtained by subtracting the electromotive force difference EdA3 represented by equation (62) from the inter-electrode electromotive force E30 represented by equation (59), the v×B component EvB3 is represented by $$\begin{aligned} EvB3 &= E30 - EdA3 \\ &= rk \cdot b3 \cdot \exp\{j \cdot (\theta 3 + \theta 00)\} \cdot \\ &\quad \{\omega 0 \cdot \exp(j \cdot \pi/2) + \gamma \cdot V \cdot \exp(j \cdot \Delta\theta 01)\} - \\ &\quad [rk \cdot b3 \cdot \exp\{j \cdot (\pi/2 + \theta 3 + \theta 00)\}] \cdot \omega 0 \\ &= [\gamma \cdot rk \cdot b3 \cdot \exp\{j \cdot (\theta 3 + \theta 00 + \Delta\theta 01)\}] \cdot V \end{aligned} \qquad (63)$$

Figure 10B:
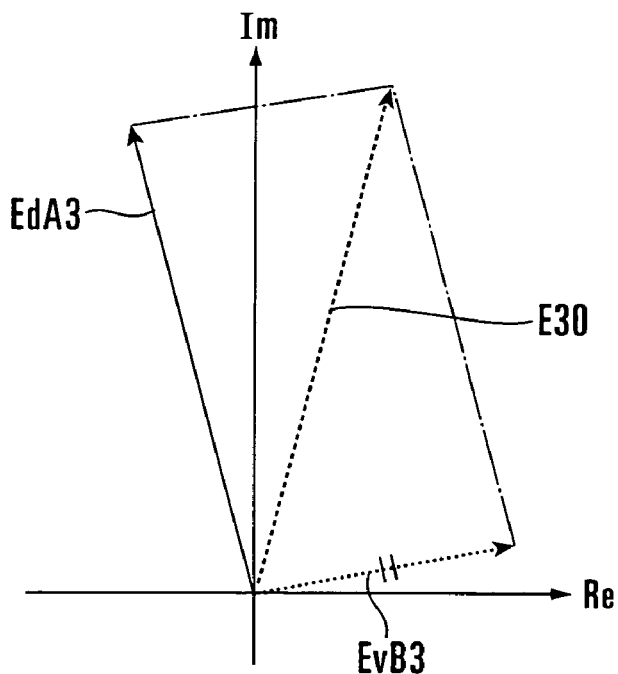
FIG. 10B is a view expressing an electromotive force difference and a v×B component in the form of complex vectors according to the third embodiment of the present invention.

The v×B component EvB3 is irrelevant to the angular frequencies $\omega 0$ and $\omega 1$. If the magnitude V of the flow velocity is 0, the v×B component EvB3 is also 0. Accordingly, the output with the corrected zero point can be obtained based on the v×B component EvB3. FIG. 10B shows the electromotive force difference EdA3 and the v×B component EvB3 in the form of complex vectors. In equation (63), the magnitude and direction of a coefficient to be applied to the magnitude V of the flow velocity are represented by a complex vector $[\gamma \cdot rk \cdot b3 \cdot \exp\{j \cdot (\theta 3 + \theta 00 + \Delta\theta 01)\}]$.

According to equation (63), the magnitude V of the flow velocity is expressed by $$\begin{aligned} V &= |EvB3|/[\gamma \cdot rk \cdot b3 \cdot \exp\{j \cdot (\theta 3 + \theta 00 + \Delta\theta 01)\}|] \\ &= |EvB3|/(\gamma \cdot rk \cdot b3) \end{aligned} \qquad (64)$$

Table 3 shows the correspondence relationship between the constants and variables used in the basic principle described above and the constants and variables in this embodiment. As is obvious from Table 3, this embodiment is an example of specifically implementing the basic principle described above.

TABLE 3

Correspondence Relationship between Basic Principle and Third Embodiment

| Constants and Variables in Basic Principle | Constants and Variables in Third Embodiment |
|---|---|
| Va + Vb | E30 |
| Va' (= Va) | EdA3 |
| Vb | EvB3 |
| rω | rk · b3 |
| θω | π/2 + θ3 + θ00 |
| rv | γ · rk · b3 |
| θv | θ3 + θ00 + Δθ01 |

A specific arrangement of the electromagnetic flowmeter of this embodiment and its operation will be described next. As described above, the arrangement of the electromagnetic flowmeter of this embodiment is the same as that in FIG. 6, and hence the electromagnetic flowmeter of this embodiment will be described by using the reference numerals in FIG. 6. The electromagnetic flowmeter of this embodiment includes the measuring tube 1, the electrodes 2a and 2b, the exciting coil 3, a power supply unit 4, a signal conversion unit 5 which obtains amplitudes and phases of two angular frequency components with the angular frequencies $\omega 0+\omega 1$ and $\omega 0-\omega 1$ of the resultant electromotive force detected by the electrodes 2a and 2b, and extracts the electromotive force difference between the two angular frequency components as the $\partial A/\partial t$ component on the basis of the amplitudes and the phases, and a flow rate output unit 6 which extracts only the v×B component by removing the $\partial A/\partial t$ component from the angular frequency $\omega 0$ component of the resultant electromotive force, and calculates the flow rate of the fluid based on the v×B component.

The power supply unit 4 supplies, to the exciting coil 3, an exciting current obtained by amplitude-modulating the sine carrier wave with the angular frequency $\omega 0$ by using the sine modulation wave with the angular frequency $\omega 1$. In this case, the amplitude modulation index ma is an arbitrary value.

Figure 11:
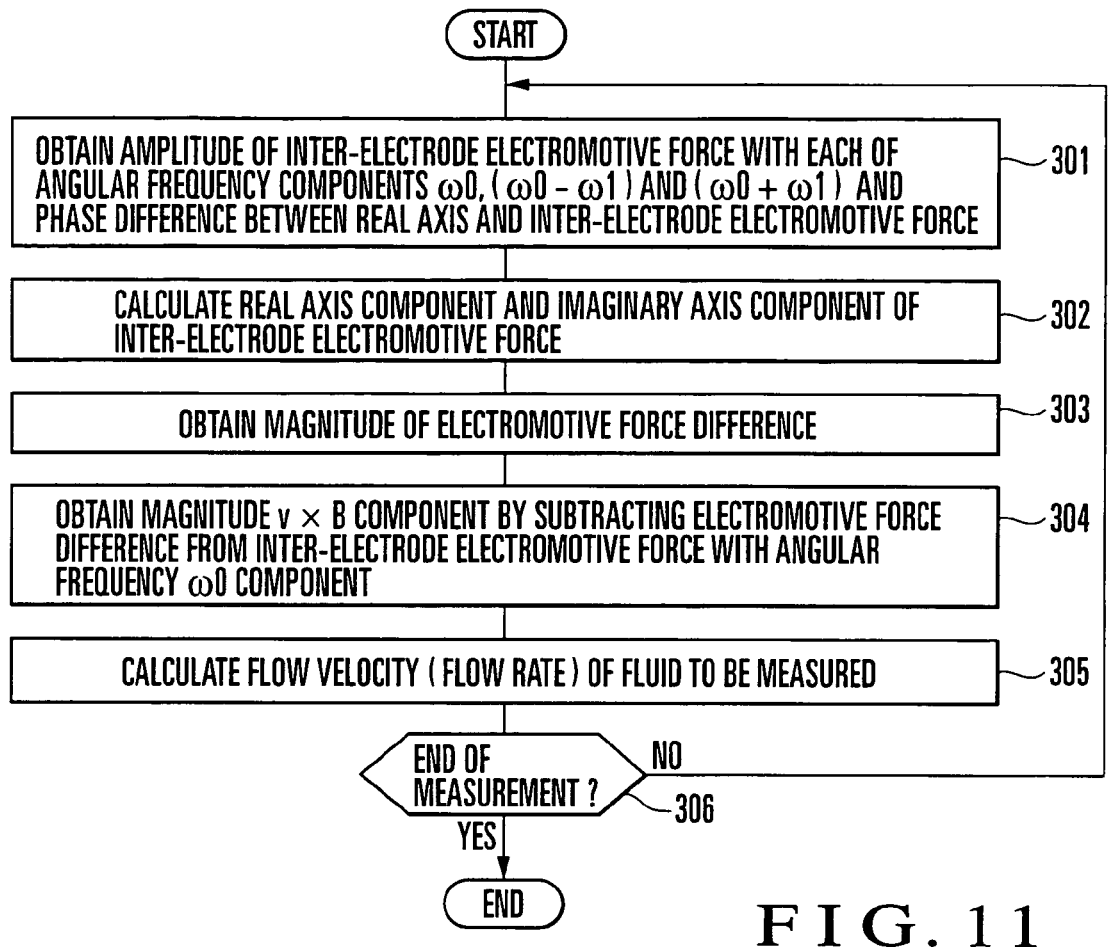
FIG. 11 is a flowchart showing the operations of a signal conversion unit and flow rate output unit according to the third embodiment of the present invention.

FIG. 11 is a flowchart showing the operations of the signal conversion unit 5 and flow rate output unit 6. First of all, the signal conversion unit 5 causes a phase detector (not shown) to obtain an amplitude r30 of the electromotive force E30 with the angular frequency $\omega 0$ component of the electromotive force between the electrodes 2a and 2b, and obtain a phase difference $\phi 30$ between the real axis and the inter-electrode electromotive force E30. Subsequently, the signal conversion unit 5 causes the phase detector to obtain an amplitude r3$p$ of the electromotive force E3$p$ with the angular frequency $(\omega 0+\omega 1)$ component of the electromotive force between the electrodes 2a and 2b, and obtain a phase difference $\phi 3p$ between the real axis and the inter-electrode electromotive force E3$p$. Furthermore, the signal conversion unit 5 causes the phase detector to obtain an amplitude r3$m$ of the electromotive force E3$m$ with the angular frequency $(\omega 0-\omega 1)$ component of the electromotive force between the electrodes 2a and 2b, and obtain a phase difference $\phi 3m$ between the real axis and the electromotive force E3$m$ (step 301 in FIG. 11).

The inter-electrode electromotive forces E30, E3$p$, and E3$m$ can also separate the frequency by a bandpass filter. However, actually, they can easily separate the frequency into three angular frequency components $\omega 0$, $(\omega 0+\omega 1)$, and $(\omega 0-\omega 1)$ by using a comb-shaped digital filter called a "comb filter".

The signal conversion unit 5 then calculates a real axis component E30$x$ and imaginary axis component E30$y$ of the inter-electrode electromotive force E30, a real axis component E3$px$ and imaginary axis component E3$py$ of the inter-electrode electromotive force E3$p$, and a real axis component E3*mx* and imaginary axis component E3*my* of the inter-electrode electromotive force E3*m* according to the following equations (step 302):

$$E30x = r30 \cdot \cos(\phi 30) \quad (65)$$

$$E30y = r30 \cdot \sin(\phi 30) \quad (66)$$

$$E3px = r3p \cdot \cos(\phi 3p) \quad (67)$$

$$E3py = r3p \cdot \sin(\phi 3p) \quad (68)$$

$$E3mx = r3m \cdot \cos(\phi 3m) \quad (69)$$

$$E3my = r3m \cdot \sin(\phi 3m) \quad (70)$$

After the calculation of equations (65) to (70), the signal conversion unit 5 obtains the magnitude of the electromotive force difference EdA3 between the inter-electrode electromotive forces E3*p* and E3*m* (step 303). The processing in step 303 corresponds to the processing of obtaining a ∂A/∂t component, and is equivalent to the calculation of equation (62). The signal conversion unit 5 calculates a real axis component EdA3*x* and imaginary axis component EdA3*y* of the electromotive force difference EdA3 according to the following equation:

$$EdA3x = (E3px - E3mx) \cdot (\omega 0/\omega 1) \cdot (1/ma) \quad (71)$$

$$EdA3y = (E3py - E3my) \cdot (\omega 0/\omega 1) \cdot (1/ma) \quad (72)$$

The flow rate output unit 6 then obtains the magnitude of the v×B component EvB3 by removing the electromotive force difference EdA3 from the inter-electrode electromotive force E30 (step 304). The processing in step 304 is equivalent to the calculation of equation (63). The flow rate output unit 6 calculates a magnitude |EvB3| of the v×B component EvB3 according to the following equation:

$$|EvB3| = \{(E30x - EdA3x)^2 + (E30y - EdA3y)^2\}^{1/2} \quad (73)$$

The flow rate output unit 6 then calculates the magnitude V of the flow velocity of the fluid to be measured according to the following equation (step 305). The processing in step 305 is equivalent to the calculation of equation (64).

$$V = |EvB3|/rv \quad (74)$$

wherein a proportion coefficient rv is a constant which can be obtained in advance by calibration or the like. The signal conversion unit 5 and the flow rate output unit 6 perform the processing in steps 301 to 305 described above in a predetermined cycle until, for example, the end of the measurement is designated by the operator (YES in step 306).

As described above, this embodiment is configured to apply the magnetic field obtained by amplitude-modulating the carrier wave with the angular frequency ω0 by using the modulated wave with the angular frequency ω1, to the fluid to be measured, extract the electromotive force difference EdA3 (the ∂A/∂t component vector Va) between the electromotive force E3*p* with the angular frequency (ω0+ω1) component and the electromotive force E3*m* with the angular frequency (ω0−ω1) component of the electromotive force between the electrodes 2*a* and 2*b*, extract the v×B component by removing the ∂A/∂t component from the inter-electrode electromotive force E30 (the resultant vector Va+Vb), and calculate, based on the v×B component, the flow rate of the fluid to be measured. Hence, the zero point of the output of the electromagnetic flowmeter can be corrected without setting the flow rate of a fluid to be measured to 0, and the stability of the zero point can be ensured even in high-frequency excitation. In this embodiment, there is no need to switch the exciting frequency as in the first embodiment. Hence, the flow rate can be calculated at higher speed.

Fourth Embodiment

The fourth embodiment of the present invention will be described next. This embodiment uses the second extraction method as a method of extracting an estimated value Va' of a vector Va of a ∂A/∂t component, of the methods described in the basic principle, and is configured to apply amplitude-modulated magnetic fields to a fluid to be measured and extract the estimated value Va' of the vector Va of the ∂A/∂t component by using the difference between a plurality of frequency components contained in an inter-electrode electromotive force. The arrangement of the electromagnetic flowmeter of this embodiment is the same as that of the electromagnetic flowmeter according to the first embodiment shown in FIG. 6. Therefore, the principle of this embodiment will be described by using the same reference numerals as in FIG. 6.

Letting E3*s* be the sum of the inter-electrode electromotive force E3*p* represented by equation (60) and the inter-electrode electromotive force E3*m* represented by equation (61), the electromotive force sum E3*s* is given by $$E3s = E3p + E3m \quad (75)$$

$$= (1/2) \cdot ma \cdot rk \cdot b3 \cdot \exp\{j \cdot (\theta 3 + \theta 00)\} \cdot$$

$$\left\{ \begin{array}{l} (\omega 0 + \omega 1) \cdot \exp(j \cdot \pi/2) + \gamma \cdot V \cdot \exp(j \cdot \Delta \theta 01) + \\ (\omega 0 - \omega 1) \cdot \exp(j \cdot \pi/2) + \gamma \cdot V \cdot \exp(j \cdot \Delta \theta 01) \end{array} \right\}$$

$$= ma \cdot rk \cdot b3 \cdot \exp\{j \cdot (\theta 3 + \theta 00)\} \cdot$$

$$\{\omega 0 \cdot \exp(j \cdot \pi/2) + \gamma \cdot V \cdot \exp(j \Delta \theta 01)\}$$

Letting EdA4 be the result obtained by multiplying the difference between the inter-electrode electromotive forces E3*p* and E3*m* by (ω0/ω1), equation (57) holds:

$$EdA4 = (E3p - E3m) \cdot (\omega 0/\omega 1) \quad (76)$$

$$= (1/2) \cdot ma \cdot rk \cdot b3 \cdot \exp\{j \cdot (\theta 3 + \theta 00)\} \cdot$$

$$\left\{ \begin{array}{l} (\omega 0 + \omega 1) \cdot \exp(j \cdot \pi/2) + \gamma \cdot V \cdot \exp(j \cdot \Delta \theta 01) - \\ (\omega 0 - \omega 1) \cdot \exp(j \cdot \pi/2) - \gamma \cdot V \cdot \exp(j \cdot \Delta \theta 01) \end{array} \right\} \cdot (\omega 0/\omega 1)$$

$$= [ma \cdot rk \cdot b3 \cdot \exp\{j \cdot (\pi/2 + \theta 3 + \theta 00)\}] \cdot \omega 0$$

An electromotive force difference EdA4 represented by equation (76) is irrelevant to a magnitude V of the flow velocity, and hence is only the component generated by ∂A/∂t. The electromotive force difference EdA4 is used to extract the v×B component from the inter-electrode electromotive force E3*s* (the resultant vector Va+Vb). To be precise, the electromotive force difference EdA4 is the value obtained by multiplying the electromotive force difference between the inter-electrode electromotive forces E3*p* and E3*m* by (ω0/ω1). However, the reason why this electromotive force difference is multiplied by (ω0/ω1) is to facilitate the development of an equation.

Letting EvB4 be the v×B component obtained by subtracting the electromotive force difference EdA4 represented by equation (76) from the inter-electrode electromotive force E3*s* represented by equation (75), the v×B component EvB4 is represented by $$EvB4 = E3s - EdA4 \quad (77)$$

$$= ma \cdot rk \cdot b3 \cdot \exp\{j \cdot (\theta3 + \theta00)\} \cdot$$

$$\{\omega0 \cdot \exp(j \cdot \pi/2) + \gamma \cdot V \cdot \exp(j \cdot \Delta\theta01)\} -$$

$$[ma \cdot rk \cdot b3 \cdot \exp\{j \cdot (\pi/2 + \theta3 + \theta00)\}] \cdot \omega0$$

$$= [ma \cdot \gamma \cdot rk \cdot b3 \cdot \exp\{j \cdot (\theta3 + \theta00 + \Delta\theta01)\}] \cdot V$$

Figure 12A:
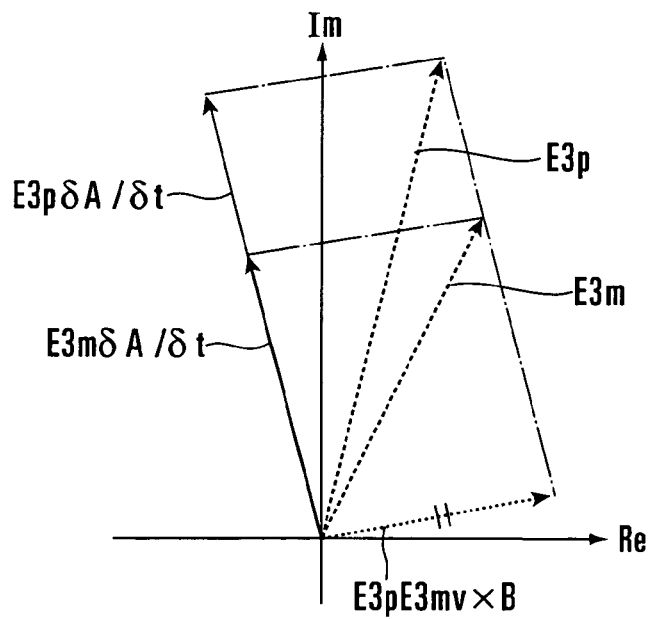
FIG. 12A is a view expressing inter-electrode electromotive forces in the form of complex vectors according to the fourth embodiment of the present invention.
Figure 12B:
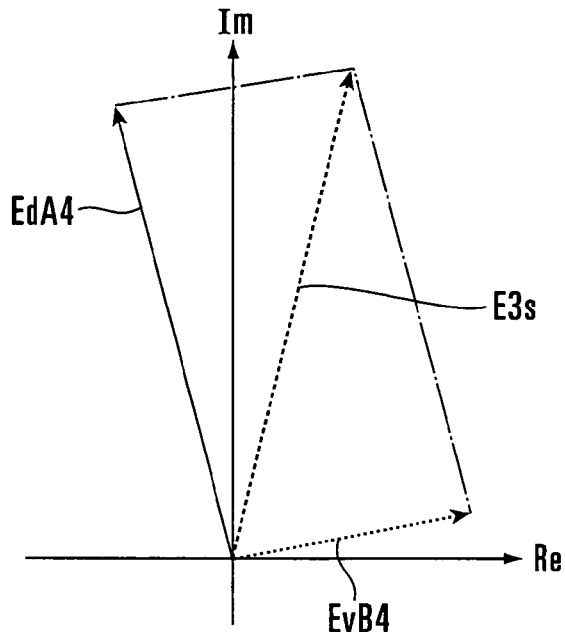
FIG. 12B is a view expressing an electromotive force sum, electromotive force difference, and v×B component in the form of complex vectors according to the fourth embodiment of the present invention.

The v×B component EvB4 is irrelevant to the angular frequencies $\omega0$ and $\omega1$. If the magnitude V of the flow velocity is 0, the v×B component EvB4 is also 0. Accordingly, the output with the corrected zero point can be obtained based on the v×B component EvB4. FIG. 12A shows the inter-electrode electromotive forces E3p and E3m in the form of complex vectors. FIG. 12B shows the electromotive force sum E3s, the electromotive force difference EdA4, and the v×B component EvB4 in the form of complex vectors. In FIG. 12A, E3p∂A/∂t represents the ∂A/∂t component $(1/2) \cdot ma \cdot rk \cdot b3 \cdot \exp\{j \cdot \pi/2+\theta3+\theta00)\} \cdot (\omega0+\omega1)$ of the inter-electrode electromotive force E3p, and E3m∂A/∂t represents the ∂A/∂t component $(1/2) \cdot ma \cdot rk \cdot b3 \cdot \exp\{j \cdot \pi/2+\theta3+\theta00)\} \cdot (\omega0-\omega1)$ of the inter-electrode electromotive force E3m. E3pE3mv×B represents the v×B component of each of the inter-electrode electromotive forces E3p and E3m. In equation (77), the magnitude and direction of a coefficient to be applied to the magnitude V of the flow velocity are represented by a complex vector $[ma \cdot \gamma \cdot rk \cdot b3 \cdot \exp\{j \cdot (\theta3+\theta00+\theta01)\}]$.

According to equation (77), the magnitude V of the flow velocity is expressed by $$V = |EvB4/[ma \cdot \gamma \cdot rk \cdot b3 \cdot \exp\{j \cdot (\theta3 + \theta00 + \Delta\theta01)\}]| \quad (78)$$

$$= |EvB4|/(ma \cdot \gamma \cdot rk \cdot b3)$$

Table 4 shows the correspondence relationship between the constants and variables used in the basic principle described above and the constants and variables in this embodiment. As is obvious from Table 4, this embodiment is an example of specifically implementing the basic principle described above.

TABLE 4

Correspondence Relationship between Basic Principle and Fourth Embodiment

| Constants and Variables in Basic Principle | Constants and Variables in Fourth Embodiment |
|---|---|
| Va + Vb | E3s |
| Va' (= Va) | EdA4 |
| Vb | EvB4 |
| rω | ma · rk · b3 |
| θω | π/2 · θ3 + θ00 |
| rv | ma · γ · rk · b3 |
| θv | θ3 + θ00 + Δθ01 |

A specific arrangement of the electromagnetic flowmeter of this embodiment and its operation will be described next. As described above, the arrangement of the electromagnetic flowmeter of this embodiment is the same as that in FIG. 6, and hence the electromagnetic flowmeter of this embodiment will be described by using the reference numerals in FIG. 6. The electromagnetic flowmeter of this embodiment includes a measuring tube 1, electrodes 2a and 2b, an exciting coil 3, a power supply unit 4, a signal conversion unit 5 which obtains amplitudes and phases of two angular frequency components with the angular frequencies $\omega0+\omega1$ and $\omega0-\omega1$ of the resultant electromotive force detected by the electrodes 2a and 2b, and extracts the electromotive force difference between the two angular frequency components as the ∂A/∂t component on the basis of the amplitudes and the phases, and a flow rate output unit 6 which extracts only the v×B component by removing the ∂A/∂t component from the electromotive force sum with the two angular frequency components of the resultant electromotive force, and calculates the flow rate of the fluid based on the v×B component.

The power supply unit 4 supplies, to the exciting coil 3, an exciting current obtained by amplitude-modulating the sine carrier wave with the angular frequency $\omega0$ by using the sine modulation wave with the angular frequency $\omega1$. In this case, the amplitude modulation index ma is an arbitrary value.

Figure 13:
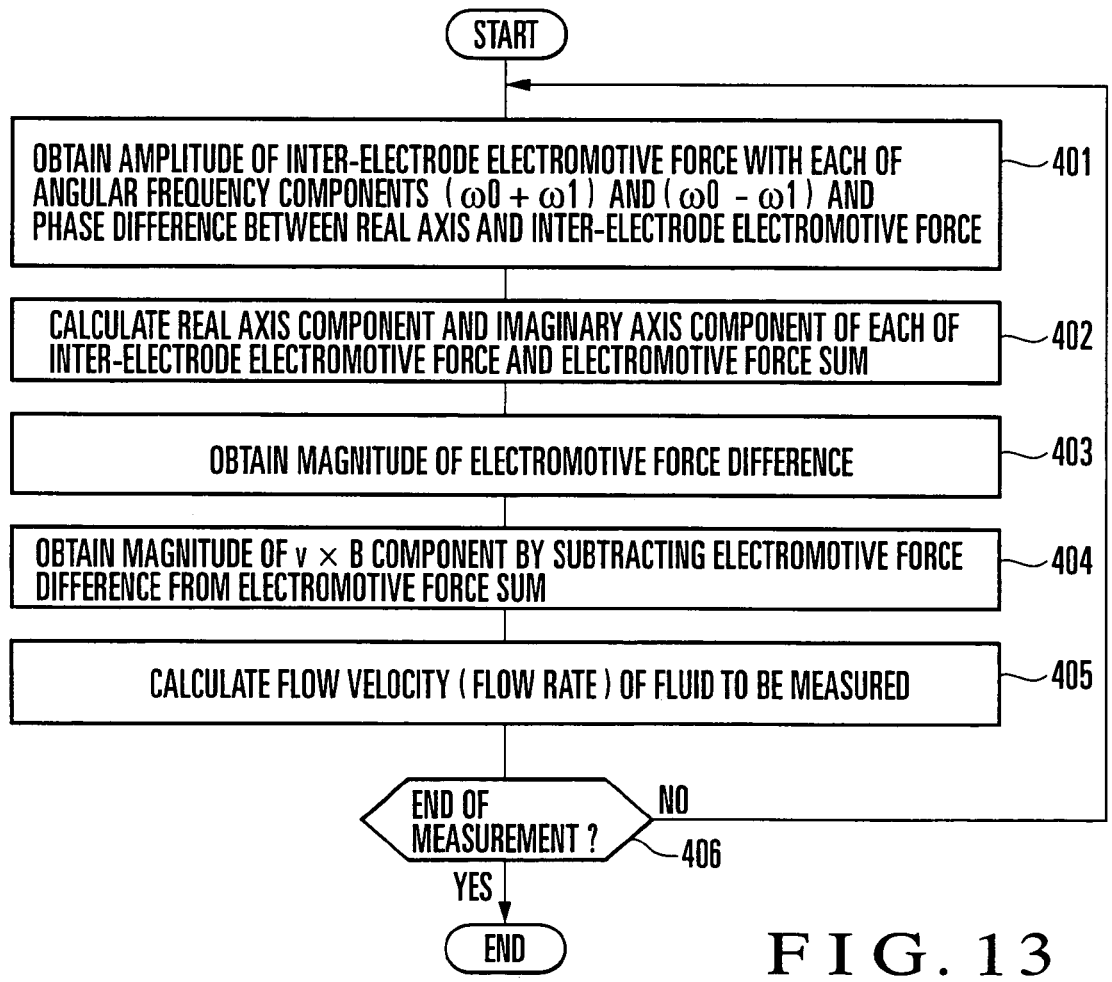
FIG. 13 is a flowchart showing the operations of a signal conversion unit and flow rate output unit according to the fourth embodiment of the present invention.

FIG. 13 is a flowchart showing the operations of the signal conversion unit 5 and flow rate output unit 6. First of all, the signal conversion unit 5 causes a phase detector (not shown) to obtain an amplitude r3p of the electromotive force E3p with the angular frequency $(\omega0+\omega1)$ component of the electromotive force between the electrodes 2a and 2b, and obtain a phase difference $\phi3p$ between the real axis and the inter-electrode electromotive force E3p. Subsequently, the signal conversion unit 5 causes the phase detector to obtain an amplitude r3m of the electromotive force E3m with the angular frequency $(\omega0-\omega1)$ component of the electromotive force between the electrodes 2a and 2b, and obtain a phase difference $\phi3m$ between the real axis and the inter-electrode electromotive force E3m (step 401 in FIG. 13). As described above, the inter-electrode electromotive forces E3p and E3m can also separate the frequency by a bandpass filter or comb filter.

The signal conversion unit 5 then calculates a real axis component E3px and imaginary axis component E3py of the inter-electrode electromotive force E3p, a real axis component E3mx and imaginary axis component E3my of the inter-electrode electromotive force E3m, and a real axis component E3sx and imaginary axis component E3sy of the electromotive force sum E3s according to the following equations (step 402):

$$E3px = r3p \cdot \cos(\phi3p) \quad (79)$$

$$E3py = r3p \cdot \sin(\phi3p) \quad (80)$$

$$E3mx = r3m \cdot \cos(\phi3m) \quad (81)$$

$$E3my = r3m \cdot \sin(\phi3m) \quad (82)$$

$$E3sx = E3px + E3mx \quad (83)$$

$$E3sy = E3py + E3my \quad (84)$$

After the calculation of equations (79) to (84), the signal conversion unit 5 obtains the magnitude of the electromotive force difference EdA4 between the inter-electrode electromotive forces E3p and E3m (step 403). The processing in step 403 corresponds to the processing of obtaining a ∂A/∂t component, and is equivalent to the calculation of equation (76). The signal conversion unit 5 calculates a real axis component EdA4x and imaginary axis component EdA4y of the electromotive force difference EdA4 according to the following equation:

$$EdA4x = (E3px - E3mx) \cdot (\omega0/\omega1) \quad (85)$$

$$EdA4y = (E3py - E3my) \cdot (\omega0/\omega1) \quad (86)$$

The flow rate output unit 6 then obtains the magnitude of the v×B component EvB4 by removing the electromotive force difference EdA4 from the electromotive force sum E3s (step 404). The processing in step 404 is equivalent to the calculation of equation (77). The flow rate output unit 6 calculates a magnitude |EvB4| of the v×B component EvB4 according to the following equation:

$$|EvB4| = \{(E3sx - EdA4x)^2 + (E3sy - EdA4y)^2\}^{1/2} \quad (87)$$

The flow rate output unit 6 then calculates the magnitude V of the flow velocity of the fluid to be measured according to the following equation (step 405). The processing in step 405 is equivalent to the calculation of equation (78).

$$V = |EvB4|/rv \quad (88)$$

wherein a proportion coefficient rv is a constant which can be obtained in advance by calibration or the like. The signal conversion unit 5 and the flow rate output unit 6 perform the processing in steps 401 to 405 described above in a predetermined cycle until, for example, the end of the measurement is designated by the operator (YES in step 406).

As described above, this embodiment is configured to apply the magnetic field obtained by amplitude-modulating the carrier wave with the angular frequency ω0 by using the modulated wave with the angular frequency ω1, to the fluid to be measured, extract the electromotive force difference EdA4 (the ∂A/∂t component vector Va) between the electromotive force E3p with the angular frequency (ω0+ω1) component and the electromotive force E3m with the angular frequency (ω0−ω1) component of the electromotive force between the electrodes 2a and 2b, extract the v×B component by removing the ∂A/∂t component from the electromotive force fun E3s (the resultant vector Va+Vb), and calculate, based on the v×B component, the flow rate of the fluid to be measured. Hence, the zero point of the output of the electromagnetic flowmeter can be corrected without setting the flow rate of a fluid to be measured to 0, and the stability of the zero point can be ensured even in high-frequency excitation. In this embodiment, there is no need to switch the exciting frequency as in the first embodiment. Hence, the flow rate can be calculated at higher speed.

Fifth Embodiment

The fifth embodiment of the present invention will be described next. This embodiment uses the second extraction method as a method of extracting an estimated value Va' of a vector Va of a ∂A/∂t component, of the methods described in the basic principle, and is configured to apply phase-/frequency-modulated magnetic fields to a fluid to be measured and extract the estimated value Va' of the vector Va of the ∂A/∂t component by using the difference between a plurality of frequency components contained in an inter-electrode electromotive force. The arrangement of the electromagnetic flowmeter of this embodiment is the same as that of the electromagnetic flowmeter according to the first embodiment shown in FIG. 6. Therefore, the principle of this embodiment will be described by using the same reference numerals as in FIG. 6.

Referring to FIG. 6, assume that a magnetic field component (magnetic flux density) B5, of the magnetic field generated from an exciting coil 3, which is orthogonal to both an electrode axis EAX connecting electrodes 2a and 2b and a measuring tube axis PAX on the electrode axis EAX is given by $$B5 = b5 \cdot \cos\{\omega 0 t - mp \cdot \cos(\omega 1 \cdot t) - \theta 5\} \quad (89)$$

In equation (89), b5 is the amplitude of the magnetic field B5, ω0 is the angular frequency of a carrier wave, ω1 is the angular frequency of a modulation wave, θ5 is the phase difference (phase delay) between the carrier wave and ω0·t−mp·cos(ω1·t), and mp is a phase modulation index. A magnetic flux density B5 will be referred to as the magnetic field B5 hereinafter.

Equation (89) can be rewritten into the following equation:

$$\begin{aligned} B5 &= b5 \cdot \cos\{\omega 0 \cdot t - mp \cdot \cos(\omega 1 \cdot t) - \theta 5\} \quad (90) \\ &= b5 \cdot \cos(\omega 0 \cdot t - \theta 5) \cdot \cos\{-mp \cdot \cos(\omega 1 \cdot t)\} - \\ &\quad b5 \cdot \sin(\omega 0 \cdot t - \theta 5) \cdot \sin\{-mp \cdot \cos(\omega 1 \cdot t)\} \\ &= b5 \cdot \cos\{mp \cdot \cos(\omega 1 \cdot t)\} \cdot \cos(\omega 0 \cdot t) \cdot \cos(-\theta 5) - \\ &\quad \sin(\omega 0 \cdot t) \cdot \sin(-\theta 5)\} + \\ &\quad b5 \cdot \sin\{mp \cdot \cos(\omega 1 \cdot t)\} \cdot \{\sin(\omega 0 \cdot t) \cdot \cos(-\theta 5) + \\ &\quad \cos(\omega 0 \cdot t) \cdot \sin(-\theta 5)\} \end{aligned}$$

Note that cos{mp·cos(ω1·t)} and sin{mp·cos(ω1·t)} in equation (90) can be transformed as follows.

$$\cos\{m_p \cos(\omega 1 t)\} = J_0(m_p) + 2 \sum_{n=2,4,\ldots}^{\infty} (-1)^{n/2} J_n(m_p) \cos(n\omega 1 t) \quad (91)$$

$$\sin\{m_p \cos(\omega 1 t)\} = 2 \sum_{n=1,3,\ldots}^{\infty} (-1)^{(n-1)/2} J_n(m_p) \cos(n\omega 1 t) \quad (92)$$

In equations (91) and (92), $J_n(mp)(n=0, 1, 2, \ldots)$ is known as the class 1 Bessel function. The class 1 Bessel function $J_n(mp)$ is given by $$J_n(m_p) = \sum_{k=0}^{\infty} \frac{(-1)^k}{k!(n+k)!} \left(\frac{m_p}{2}\right)^{n+2k} \quad (93)$$

Note that k! in equation (93) means k factorial. Rewriting equation (90) for n=0, 1 in equations (91) and (92) yields the following.

$$\begin{aligned} B5 = \quad & (94) \\ J_0(mp) \cdot b5 \cdot \{\cos(\theta 5)\} \cdot \cos(\omega 0 \cdot t) + J_0(mp) \cdot b5 \cdot \{\sin(\theta 5)\} \cdot \sin(\omega 0 \cdot t) + \\ & J_1(mp) \cdot b5 \cdot \{-\sin(\theta 5)\} \cdot \cos\{(\omega 0 + \omega 1) \cdot t\} + \\ & J_1(mp) \cdot b5 \cdot \{\cos(\theta 5)\} \cdot \sin\{(\omega 0 + \omega 1) \cdot t\} + \\ & J_1(mp) \cdot b5 \cdot \{-\sin(\theta 5)\} \cdot \cos\{(\omega 0 - \omega 1) \cdot t\} + \\ & J_1(mp) \cdot b5 \cdot \{\cos(\theta 5)\} \cdot \sin\{(\omega 0 - \omega 1) \cdot t\} \end{aligned}$$

An inter-electrode electromotive force which originates from a change in magnetic field and is irrelevant to the flow velocity of a fluid to be measured will be described first. Since the electromotive force originating from the change in magnetic field depends on a time derivative dB/dt of the magnetic field, and hence the magnetic field B5 generated by the exciting coil 3 is differentiated according to $$\frac{dB5}{dt} = J_0(mp) \cdot \omega 0 \cdot b5 \cdot \{\sin(\theta 5)\} \cdot \cos(\omega 0 \cdot t) + \quad (95)$$
$$J_0(mp) \cdot \omega 0 \cdot b5 \cdot \{-\cos(\theta 5)\} \cdot \sin(\omega 0 \cdot t) +$$
$$J_1(mp) \cdot (\omega 0 + \omega 1) \cdot b5 \cdot \{\cos(\theta 5)\} \cdot \cos\{(\omega 0 + \omega 1) \cdot t\} +$$
$$J_1(mp) \cdot (\omega 0 + \omega 1) \cdot b5 \cdot \{\sin(\theta 5)\} \cdot \sin\{(\omega 0 + \omega 1) \cdot t\} +$$
$$J_1(mp) \cdot (\omega 0 - \omega 1) \cdot b5 \cdot \{\cos(\theta 5)\} \cdot \cos\{(\omega 0 - \omega 1) \cdot t\} +$$
$$J_1(mp) \cdot (\omega 0 - \omega 1) \cdot b5 \cdot \{\sin(\theta 5)\} \cdot \sin\{(\omega 0 - \omega 1) \cdot t\}$$

If the flow velocity of the fluid to be measured is 0, a generated eddy current I is directed as shown in FIG. 3 as in the first embodiment. Therefore, an inter-electrode electromotive force E which is generated by a change in the magnetic field Ba and is irrelevant to the flow velocity is obtained within a plane including the electrode axis EAX and the measuring tube axis PAX by multiplying each of the angular frequency components ω0, (ω0−ω1), and (ω0+ω1) of a time derivative −dB5/dt of a magnetic field whose direction is taken into consideration by a proportion coefficient rk, and substituting θ5+θ00 into the phase θ5 (rk and θ00 are associated with the conductivity and permittivity of the fluid to be measured and the structure of the measuring tube 1 including the arrangement of the electrodes 2a and 2b), as indicated by the following equation:

$$E = J_0(mp) \cdot rk \cdot \omega 0 \cdot b5 \cdot \{-\sin(\theta 5 + \theta 00)\} \cdot \cos(\omega 0 \cdot t) + \quad (96)$$
$$J_0(mp) \cdot rk \cdot \omega 0 \cdot b5 \cdot \{\cos(\theta 5 + \theta 00)\} \cdot \sin(\omega 0 \cdot t) +$$
$$J_1(mp) \cdot rk \cdot (\omega 0 + \omega 1) \cdot b5 \cdot \{-\cos(\theta 5 + \theta 00)\} \cdot \cos\{(\omega 0 + \omega 1) \cdot t\} +$$
$$J_1(mp) \cdot rk \cdot (\omega 0 + \omega 1) \cdot b5 \cdot \{-\sin(\theta 5 + \theta 00)\} \cdot \sin\{(\omega 0 + \omega 1) \cdot t\} +$$
$$J_1(mp) \cdot rk \cdot (\omega 0 - \omega 1) \cdot b5 \cdot \{-\cos(\theta 5 + \theta 00)\} \cdot \cos\{(\omega 0 - \omega 1) \cdot t\} +$$
$$J_1(mp) \cdot rk \cdot (\omega 0 - \omega 1) \cdot b5 \cdot \{-\sin(\theta 5 + \theta 00)\} \cdot \sin\{(\omega 0 - \omega 1) \cdot t\}$$

The inter-electrode electromotive force originating from the flow velocity of the fluid to be measured will be described next. Letting V (V≠0) be the magnitude of the flow velocity of the fluid, since a component v×Ba originating from a flow velocity vector v of the fluid to be measured is generated in a generated eddy current in addition to the eddy current I when the flow velocity is 0, an eddy current Iv generated by the flow velocity vector v and the magnetic field Ba is directed as shown in FIG. 4 as in the first embodiment. In this case, as indicated by the following equation, the inter-electrode electromotive force Ev originating from the flow velocity is the value obtained by multiplying each of the angular frequency components ω0, (ω0−ω1), and (ω0+ω1) of the magnetic field B5 by a proportion coefficient rkv, and substituting θ5+θ01 into the phase θ5 (rkv and θ01 are associated with a magnitude V of the flow velocity, the conductivity and permittivity of the fluid to be measured, and the structure of the measuring tube 1 including the arrangement of the electrodes 2a and 2b), as indicated by the following equation:

$$Ev = J_0(mp) \cdot rkv \cdot b5 \cdot \{\cos(\theta 5 + \theta 01)\} \cdot \cos(\omega 0 \cdot t) + \quad (97)$$
$$J_0(mp) \cdot rkv \cdot b5 \cdot \{\sin(\theta 5 + \theta 01)\} \cdot \sin(\omega 0 \cdot t) +$$
$$J_1(mp) \cdot rkv \cdot b5 \cdot \{-\sin(\theta 5 + \theta 01)\} \cdot \cos\{(\omega 0 + \omega 1) \cdot t\} +$$

-continued
$$J_1(mp) \cdot rkv \cdot b5 \cdot \{\cos(\theta 5 + \theta 01)\} \cdot \sin\{(\omega 0 + \omega 1) \cdot t\} +$$
$$J_1(mp) \cdot rkv \cdot b5 \cdot \{-\sin(\theta 5 + \theta 01)\} \cdot \cos\{(\omega 0 - \omega 1) \cdot t\} +$$
$$J_1(mp) \cdot rkv \cdot b5 \cdot \{\cos(\theta 5 + \theta 01)\} \cdot \sin\{(\omega 0 - \omega 1) \cdot t\}$$

Of an overall inter-electrode electromotive force obtained by combining the electromotive force obtained by converting the inter-electrode electromotive force E represented by equation (96) into a complex vector and the electromotive force obtained by converting the inter-electrode electromotive force Ev represented by equation (97) into a complex vector, an electromotive force Ea50c with the angular frequency ω0 component is expressed by the first and second terms of equation (96), the first and second terms of equation (97), and equation (20).

$$Ea50c = J_0(mp) \cdot rk \cdot \omega 0 \cdot b5 \cdot \exp\{j \cdot (\pi/2 + \theta 5 + \theta 00)\} + J_0(mp) \cdot \gamma \cdot rk \cdot V \cdot b5 \cdot \exp\{j \cdot (\theta 5 + \theta 01)\} \quad (98)$$

Of the overall inter-electrode electromotive force obtained by combining the electromotive force obtained by converting the inter-electrode electromotive force E represented by equation (96) into a complex vector and the electromotive force obtained by converting the inter-electrode electromotive force Ev represented by equation (97) into a complex vector, an electromotive force Ea5pc with an angular frequency (ω0 +ω1) component is expressed by the third and fourth terms of equation (96), the third and fourth terms of equation (97), and equation (20).

$$Ea5pc = J_1(mp) \cdot rk \cdot (\omega 0 + \omega 1) \cdot b5 \cdot \exp\{j \cdot (\pi + \theta 5 + \theta 00)\} + \quad (99)$$
$$J_1(mp) \cdot \gamma \cdot rk \cdot V \cdot b5 \cdot \exp\{j \cdot ((\pi/2 + \theta 5 + \theta 01)\}$$

Of the overall inter-electrode electromotive force obtained by combining the electromotive force obtained by converting the inter-electrode electromotive force E represented by equation (96) into a complex vector and the electromotive force obtained by converting the inter-electrode electromotive force Ev represented by equation (97) into a complex vector, an electromotive force Ea5mc with an angular frequency (ω0−ω1) component is expressed by the fifth and sixth terms of equation (96), the fifth and sixth terms of equation (97), and equation (20).

$$Ea5mc = J_1(mp) \cdot rk \cdot (\omega 0 - \omega 1) \cdot b5 \cdot \quad (100)$$
$$\exp\{j \cdot (\pi + \theta 5 + \theta 00)\} +$$
$$J_1(mp) \cdot \gamma \cdot rk \cdot V \cdot b5 \cdot$$
$$\exp\{j \cdot (\pi/2 + \theta 5 + \theta 01)\}$$

Assume that θ01=θ00+Δθ01 represents the relationship between an angle θ00 of the vector Va with respect to the imaginary axis and an angle θ01 of the vector Vb with respect to the real axis. In this case, letting E50 be the electromotive force Ea50c obtained by substituting θ01=θ00+Δθ01 into equation (98), E50 is given by $$E50 = J_0(mp) \cdot rk \cdot \omega 0 \cdot b5 \cdot \exp\{j \cdot (\pi/2 + \theta 5 + \theta 00)\} + \quad (101)$$
$$J_0(mp) \cdot \gamma \cdot rk \cdot V \cdot b5 \cdot \exp\{j \cdot (\theta 5 + \theta 00 + \Delta \theta 01)\}$$

$$-\text{continued}$$
$$= J_0(mp) \cdot rk \cdot b5 \cdot \exp\{j \cdot (\theta5 + \theta00)\} \cdot$$
$$\{\omega0 \cdot \exp(j \cdot \pi/2) + \gamma \cdot V \cdot \exp\{j \cdot \Delta\theta01\}\}$$

Letting E5$p$ be the electromotive force Ea5$pc$ obtained by substituting $\theta01=\theta00+\Delta\theta01$ into equation (99), E5$p$ is represented as follows:

$$E5p = J_1(mp) \cdot rk \cdot (\omega0 + \omega1) \cdot b5 \cdot \tag{102}$$
$$\exp\{j \cdot (\pi + \theta5 + \theta00)\} +$$
$$J_1(mp) \cdot \gamma \cdot rk \cdot V \cdot b5 \cdot$$
$$\exp\{j \cdot (\pi/2 + \theta5 + \theta00 + \Delta\theta01)\}$$
$$= J_1(mp) \cdot rk \cdot b5 \cdot \exp\{j \cdot (\pi/2 + \theta5 + \theta00)\} \cdot$$
$$\{(\omega0 + \omega1) \cdot \exp(j \cdot \pi/2) + \gamma \cdot V \cdot \exp\{j \cdot \Delta\theta01\}\}$$

Similarly, letting E5$m$ be the electromotive force Ea5$mc$ obtained by substituting $\theta01=\theta00+\Delta\theta01$ into equation (100), E5$m$ is represented as follows:

$$E5m = J_1(mp) \cdot rk \cdot (\omega0 - \omega1) \cdot b5 \cdot \tag{103}$$
$$\exp\{j \cdot (\pi + \theta5 + \theta00)\} +$$
$$J_1(mp) \cdot \gamma \cdot rk \cdot V \cdot b5 \cdot$$
$$\exp\{j \cdot (\pi/2 + \theta5 + \theta00 + \Delta\theta01)\}$$
$$= J_1(mp) \cdot rk \cdot b5 \cdot \exp\{j \cdot (\pi/2 + \theta5 + \theta00)\} \cdot$$
$$\{(\omega0 - \omega1) \cdot \exp(j \cdot \pi/2) + \gamma \cdot V \cdot \exp\{j \cdot \Delta\theta01\}\}$$

Figure 14A:
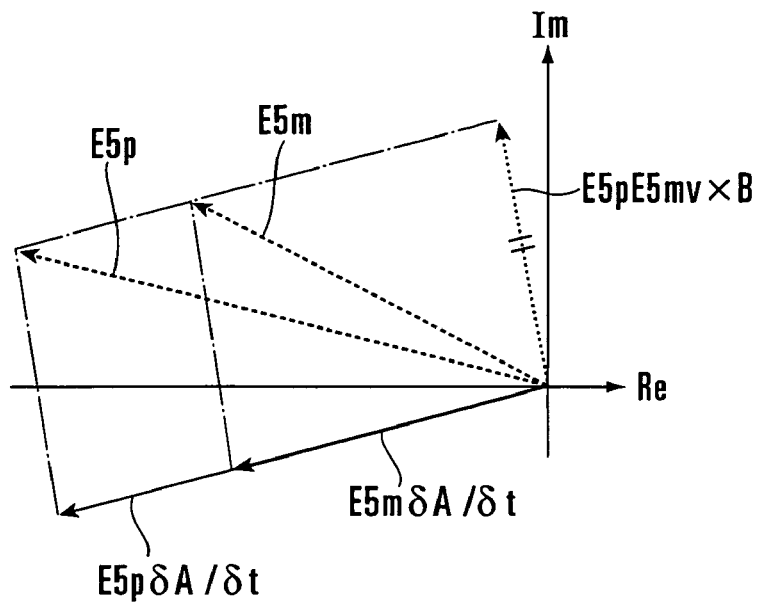
FIG. 14A is a view expressing inter-electrode electromotive forces in the form of complex vectors according to the fifth embodiment of the present invention.

FIG. 14A shows the inter-electrode electromotive forces E5$p$ and E5$m$ in the form of complex vectors. In FIG. 14A, E5$p\partial A/\partial t$ represents the $\partial A/\partial t$ component $J_1(mp) \cdot rk \cdot b5 \cdot \exp\{j \cdot (\pi+\theta5+\theta00)\} \cdot (\omega0+\omega1)$ of the inter-electrode electromotive force E5$p$, and E5$m\partial A/\partial t$ represents the $\partial A/\partial t$ component $J_1(mp) \cdot rk \cdot b5 \cdot \exp\{j \cdot (\pi+\theta5+\theta00)\} \cdot (\omega0-\omega1)$ of the inter-electrode electromotive force E5$m$. E5$p$E5$mv \times B$ represents the v×B component of each of the inter-electrode electromotive forces E5$p$ and E5$m$. Letting EdA5 be the result obtained by multiplying the difference between the inter-electrode electromotive forces E5$p$ and E5$m$ by $(\omega0/\omega1) \cdot J_0(mp)/\{2 \cdot J_1(mp)\} \cdot \exp\{j \cdot (-\pi/2)\}$, equation (104) holds:

$$EdA5 = (E5p - E5m) \cdot (\omega0/\omega1) \cdot J_0(mp)/ \tag{104}$$
$$\{2 \cdot J_1(mp)\} \cdot \exp\{j \cdot (-\pi/2)\}$$
$$= J_1(mp) \cdot rk \cdot b5 \cdot \exp\{j \cdot (\theta5 + \theta00)\} \cdot$$
$$\{(\omega0 + \omega1) \cdot \exp(j \cdot \pi/2) + \gamma \cdot V \cdot \exp(j \cdot \Delta\theta01) -$$
$$(\omega0 - \omega1) \cdot \exp(j \cdot \pi/2) - \gamma \cdot V \cdot \exp(j \cdot \Delta\theta01)\} \cdot$$
$$\{(\omega0/\omega1) \cdot J_0(mp)/\{2 \cdot J_1(mp)\} \cdot$$
$$\exp\{j \cdot (-\pi/2)\}$$
$$= J_0(mp) \cdot rk \cdot b5 \cdot \exp\{j \cdot (\pi/2 + \theta5 + \theta00)\} \cdot \omega0$$

An electromotive force difference EdA5 represented by equation (104) is irrelevant to a magnitude V of the flow velocity, and hence is only the component generated by $\partial A/\partial t$. The electromotive force difference EdA5 is used to extract the v×B component from the inter-electrode electromotive force E50 (the resultant vector Va+Vb). To be precise, the electromotive force difference EdA5 is the value obtained by multiplying the electromotive force difference between the inter-electrode electromotive forces E5$p$ and E5$m$ by $(\omega0/\omega1) \cdot J_0(mp)/\{2 \cdot J_1(mp)\} \cdot \exp\{j \cdot (-\pi/2)\}$. However, the reason why this electromotive force difference is multiplied by $(\omega0/\omega1) \cdot J_0(mp)/\{2 \cdot J_1(mp)\} \cdot \exp\{j \cdot (-\pi/2)\}$ is to facilitate the development of an equation.

Letting EvB5 be the v×B component obtained by subtracting the electromotive force difference EdA5 represented by equation (104) from the inter-electrode electromotive force E50 represented by equation (101), the v×B component EvB5 is represented by $$EvB5 = E50 - EdA5 \tag{105}$$
$$J_0(mp) \cdot rk \cdot b5 \cdot \exp\{j \cdot (\theta5 + \theta00)\} \cdot$$
$$\{\omega0 \cdot \exp(j \cdot \pi/2) + \gamma \cdot V \cdot \exp(j \cdot \Delta\theta01)\} -$$
$$J_0(mp) \cdot rk \cdot b5 \cdot \exp\{j \cdot (\pi/2 + \theta5 + \theta00)\} \cdot \omega0$$
$$= J_0(mp) \cdot \gamma \cdot rk \cdot b5 \cdot$$
$$\exp\{j \cdot (\theta5 + \theta00 + \Delta\theta01)\}] \cdot V$$

Figure 14B:
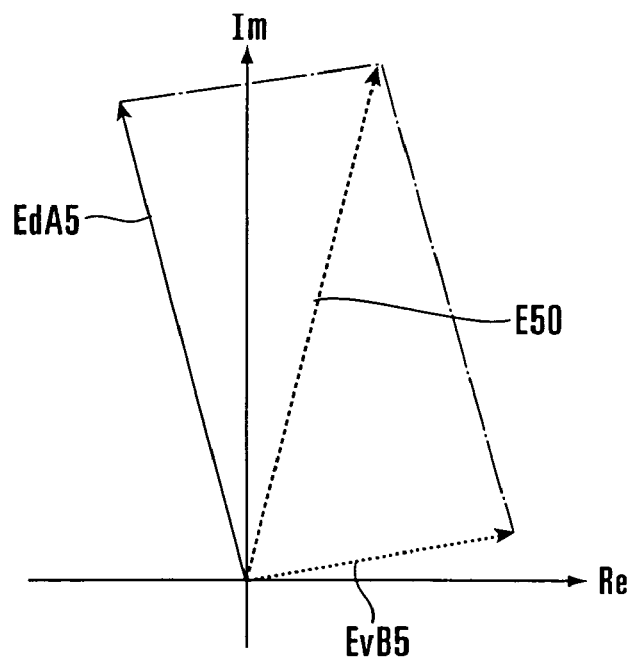
FIG. 14B is a view expressing an electromotive force difference and a v×B component in the form of complex vectors in the fifth embodiment of the present invention.

The v×B component EvB5 is irrelevant to the angular frequencies $\omega0$ and $\omega1$. If the magnitude of the flow velocity is 0, the v×B component EvB5 is also 0. Accordingly, the output with the corrected zero point can be obtained based on the v×B component EvB5. FIG. 14B shows the inter-electrode electromotive force E50, the electromotive force difference EdA5, and the v×B component EvB5 in the form of complex vectors. In equation (105), the magnitude and direction of a coefficient to be applied to the magnitude V of the flow velocity are represented by a complex vector $[J_0(mp) \cdot \gamma \cdot rk \cdot b5 \cdot \exp\{j \cdot (\theta5+\theta00+\Delta\theta01)\}]$.

According to equation (105), the magnitude V of the flow velocity is expressed by $$V = |EvB5 / [J_0(mp) \cdot \gamma \cdot rk \cdot b5 \cdot \tag{106}$$
$$\exp\{j \cdot (\theta5 + \theta00 + \Delta\theta01)\}]|$$
$$= |EvB5|/(J_0(mp) \cdot \gamma \cdot rk \cdot b5)$$

Table 5 shows the correspondence relationship between the constants and variables used in the basic principle described above and the constants and variables in this embodiment. As is obvious from Table 5, this embodiment is an example of specifically implementing the basic principle described above.

TABLE 5

Correspondence Relationship between Basic Principle and Fifth Embodiment

| Constants and Variables in Basic Principle | Constants and Variables in Fifth Embodiment |
|---|---|
| Va + Vb | E50 |
| Va' (= Va) | EdA5 |
| Vb | EvB5 |
| r$\omega$ | $J_0$(mp) · rk · b5 |

TABLE 5-continued

Correspondence Relationship between Basic Principle and Fifth Embodiment

| Constants and Variables in Basic Principle | Constants and Variables in Fifth Embodiment |
| --- | --- |
| θω | π/2 + θ5 + θ00 |
| rv | $J_0$ (mp) · γ · rk · b5 |
| θv | θ5 + θ00 + Δθ01 |

A specific arrangement of the electromagnetic flowmeter of this embodiment and its operation will be described next. As described above, the arrangement of the electromagnetic flowmeter of this embodiment is the same as that in FIG. 6, and hence the electromagnetic flowmeter of this embodiment will be described by using the reference numerals in FIG. 6. The electromagnetic flowmeter of this embodiment includes the measuring tube 1, the electrodes 2a and 2b, the exciting coil 3, a power supply unit 4, a signal conversion unit 5 which obtains amplitudes and phases of two different angular frequency components from a component with an angular frequency ω0±ξ·ω1 (where ξ is a positive integer) of the resultant electromotive force detected by the electrodes 2a and 2b, and extracts the electromotive force difference between the two angular frequency components as the ∂A/∂t component on the basis of the amplitudes and the phases, and a flow rate output unit 6 which extracts only the v×B component by removing the ∂A/∂t component from an arbitrary one of the angular frequency components ω0 and ω0±ξ·ω1 of the resultant electromotive force, and calculates the flow rate of the fluid based on the v×B component.

The power supply unit 4 supplies, to the exciting coil 3, an exciting current obtained by phase-modulating the sine carrier wave with the angular frequency ω0 by using the sine modulation wave with the angular frequency ω1. In this case, the amplitude modulation index mp is an arbitrary value.

The operation procedures of the signal conversion unit 5 and flow rate output unit 6 of this embodiment are the same as those in the third embodiment. Therefore, the operation of the signal conversion unit 5 and flow rate output unit 6 of this embodiment will be described by using the same reference numerals as in FIG. 11. First of all, the signal conversion unit 5 causes a phase detector (not shown) to obtain an amplitude r50 of the electromotive force E50 with the angular frequency ω0 component of the electromotive force between the electrodes 2a and 2b, and obtain a phase difference φ50 between the real axis and the inter-electrode electromotive force E50. Subsequently, the signal conversion unit 5 causes the phase detector to obtain an amplitude r5p of the electromotive force E5p with the angular frequency (ω0+ω1) component of the electromotive force between the electrodes 2a and 2b, and obtain a phase difference φ5p between the real axis and the inter-electrode electromotive force E5p. Furthermore, the signal conversion unit 5 causes the phase detector to obtain an amplitude r5m of the electromotive force E5m with the angular frequency (ω0−ω1) component of the electromotive force between the electrodes 2a and 2b, and obtain a phase difference φ5m between the real axis and the electromotive force E5m (step 301 in FIG. 11). The inter-electrode electromotive forces E50, E5p, and E5m can also separate the frequency by a bandpass filter or comb filter.

The signal conversion unit 5 then calculates a real axis component E50x and imaginary axis component E50y of the inter-electrode electromotive force E50, a real axis component E5px and imaginary axis component E5py of the inter-electrode electromotive force E5p, and a real axis component E5mx and imaginary axis component E5my of the inter-electrode electromotive force E5m according to the following equations (step 302):

$$E50x = r50 \cdot \cos(\phi 50) \tag{107}$$

$$E50y = r50 \cdot \sin(\phi 50) \tag{108}$$

$$E5px = r5p \cdot \cos(\phi 5p) \tag{109}$$

$$E5py = r5p \cdot \sin(\phi 5p) \tag{110}$$

$$E5mx = r5m \cdot \cos(\phi 5m) \tag{111}$$

$$E5my = r5m \cdot \sin(\phi 5m) \tag{112}$$

After the calculation of equations (107) to (112), the signal conversion unit 5 obtains the magnitude of the electromotive force difference EdA5 between the inter-electrode electromotive forces E5p and E5m (step 303). The processing in step 303 corresponds to the processing of obtaining a ∂A/∂t component, and is equivalent to the calculation of equation (104). The signal conversion unit 5 calculates a real axis component EdA5x and imaginary axis component EdA5y of the electromotive force difference EdA5 according to the following equation:

$$EdA5x = (E5px - E5mx) \cdot (\omega 0/\omega 1) \cdot J_0(mp)/\{2 \cdot J_1(mp)\} \cdot \exp\{j \cdot (-\pi/2)\} \tag{113}$$

$$EdA5y = (E5py - E5my) \cdot (\omega 0/\omega 1) \cdot J_0(mp)/\{2 \cdot J_1(mp)\} \cdot \exp\{j \cdot (-\pi/2)\} \tag{114}$$

where Bessel functions $J_0(mp)$ and $J_1(mp)$ are arbitrary values.

The flow rate output unit 6 then obtains the magnitude of the v×B component EvB5 by removing the electromotive force difference EdA5 from the inter-electrode electromotive force E50 (step 304). The processing in step 304 is equivalent to the calculation of equation (105). The flow rate output unit 6 calculates a magnitude |EvB5| of the v×B component EvB5 according to the following equation:

$$|EvB5| = \{(E50x - EdA5x)^2 + (E50y - EdA5y)^2\}^{1/2} \tag{115}$$

The flow rate output unit 6 then calculates the magnitude V of the flow velocity of the fluid to be measured according to the following equation (step 305). The processing in step 305 is equivalent to the calculation of equation (106).

$$V = |EvB5|/rv \tag{116}$$

wherein a proportion coefficient rv is a constant which can be obtained in advance by calibration or the like, and Bessel function $J_0$(mp) included in the proportion coefficient rv is an arbitrary value. The signal conversion unit 5 and the flow rate output unit 6 perform the processing in steps 301 to 305 described above in a predetermined cycle until, for example, the end of the measurement is designated by the operator (YES in step 306).

As described above, this embodiment is configured to apply the magnetic field obtained by phase-modulating the carrier wave with the angular frequency ω0 by using the modulated wave with the angular frequency ω1, to the fluid to be measured, extract the electromotive force difference EdA5 (the ∂A/∂t component vector Va) between the electromotive force E5p with the angular frequency (ω0+ω1) component and the electromotive force E5m with the angular frequency (ω0−ω1) component of the electromotive force between the electrodes 2a and 2b, extract the v×B component by removing the ∂A/∂t component from the inter-electrode electromotive force E50 (the resultant vector Va+Vb), and calculate, based on the v×B component, the flow rate of the fluid to be measured. Hence, the zero point of the output of the electromagnetic flowmeter can be corrected without setting the flow rate of a fluid to be measured to 0, and the stability of the zero point can be ensured even in high-frequency excitation. In this embodiment, there is no need to switch the exciting frequency as in the first embodiment. Hence, the flow rate can be calculated at higher speed.

In this embodiment, the ∂A/∂t component is removed from the electromotive force E50 with the angular frequency ω0 component. However, the ∂A/∂t component may be removed from the electromotive force E5p with the angular frequency (ω0+ω1) component, or from the electromotive force E5m with the angular frequency (ω0−ω1) component.

In this embodiment, the power supply unit 4 supplies, to the exciting coil 3, the exciting current obtained by phase-modulating the sine carrier wave with the angular frequency ω0 by using the sine modulation wave with the angular frequency ω1. However, the present invention is not limited to this. The power supply unit 4 may supply, to the exciting coil 3, the exciting current obtained by frequency-modulating the sine carrier wave with the angular frequency ω0 by using the sine modulation wave with the angular frequency ω1.

The following description will be made assuming that the frequency modulation is equivalent to the phase modulation. In FIG. 6, of a magnetic field generated by the exciting coil 3, a magnetic field component (magnetic flux density) B5 orthogonal to both an electrode axis EAX connecting the electrodes 2a and 2b and the measuring tube axis PAX on the electrode axis EAX is given by $$B5 = b5 \cdot \cos\{\omega 0 \cdot t - mf \cdot \sin(\omega 1 \cdot t) - \theta 5\} \quad (117)$$

In equation (117), b5 is an amplifier, ω0 and ω1 are angular frequencies, θ5 is a phase difference (phase delay) with respect to ω0·t−mf·sin(ω1·t), and mf is a frequency modulation index.

A frequency modulation index mf is given by $$mf = \Delta\omega 1/\omega 1 \quad (118)$$

In equation (118), letting Δω1 be an angular frequency band, and ΔF be a frequency shift amount when the amplitude of the modulation wave is maximum, Δω1=2·π·ΔF.

Equation (117) can be rewritten as follows:

$$\begin{aligned}B5 &= b5 \cdot \cos\{\omega 0 \cdot t - mf \cdot \sin(\omega 1 \cdot t) - \theta 5\} \\&= b5 \cdot \cos(\omega 0 \cdot t - \theta 5) \cdot \cos\{-mf \cdot \sin(\omega 1 \cdot t)\} - \\&\quad b5 \cdot \sin(\omega 0 \cdot t - \theta 5) \cdot \sin\{-mf \cdot \sin(\omega 1 \cdot t)\} \\&= b5 \cdot \cos\{mf \cdot \sin(\omega 1 \cdot t)\} \cdot \cos(\omega 1 \cdot t) \cdot \\&\quad \cos(-\theta 5) - \sin(\omega 0 \cdot t)\sin(-\theta 5)\} + \\&\quad b5 \cdot \sin\{mf \cdot \sin(\omega 1 \cdot t)\} \cdot \sin\{(\omega 0 \cdot t) \cdot \\&\quad \cos(-\theta 5) + \cos(\omega 0 \cdot t)\sin(-\theta 5)\}\end{aligned} \quad (119)$$

Note that cos{mf·sin(ω1·t)} and sin{mf·sin(ω1·t)} in equation (119) can be transformed as follows.

$$\cos\{m_f \sin(\omega 1 t)\} = J_0(m_f) + 2 \sum_{n=2,4,\ldots}^{\infty} (-1)^{n/2} J_n(m_f)\sin(n\omega 1 t) \quad (120)$$

$$\sin\{m_f \sin(\omega 1 t)\} = 2 \sum_{n=1,3,\ldots}^{\infty} (-1)^{(n-1)/2} J_n(m_f)\sin(n\omega 1 t) \quad (121)$$

In equations (120) and (121), $J_n(mf)(n=0, 1, 2, \ldots)$ is known as the class 1 Bessel function. The class 1 Bessel function $J_n(mf)$ is given by $$J_n(m_f) = \sum_{k=0}^{\infty} \frac{(-1)^k}{k!(n+k)!}\left(\frac{m_f}{2}\right)^{n+2k} \quad (122)$$

Note that k! in equation (122) means k factorial. Rewriting equation (119) for n=0, 1 in equations (120) and (121) yields the following.

$$\begin{aligned}B5 &= b5 \cdot J_0(mf) \cdot \{\cos(\omega 0 \cdot t) \cdot \cos(-\theta 5) - \\&\quad \sin(\omega 0 \cdot t) \cdot \sin(-\theta 5)\} + \\&\quad b5 \cdot 2 \cdot J_1(mf) \cdot \cos(\omega 1 \cdot t) \cdot \{\sin(\omega 0 \cdot t) \cdot \\&\quad \cos(-\theta 5) + \cos(\omega 0 \cdot t) \cdot \sin(-\theta 5)\} \\&= J_0(mf) \cdot b5 \cdot \{\cos(\theta 5)\} \cdot \cos(\omega 0 \cdot t) + \\&\quad J_0(mf) \cdot b5 \cdot \{\sin(\theta 5)\} \cdot \sin(\omega 0 \cdot t) + \\&\quad J_1(mf) \cdot b5 \cdot \{-\sin(\theta 5)\} \cdot \cos\{(\omega 0 + \omega 1) \cdot t\} + \\&\quad J_1(mf) \cdot b5\{\cos(\theta 5)\} \cdot \sin\{(\omega 0 + \omega 1) \cdot t\} + \\&\quad J_1(mf) \cdot b5 \cdot \{-\sin(\theta 5)\} \cdot \cos\{(\omega 0 - \omega 1) \cdot t\} + \\&\quad J_1(mf) \cdot b5 \cdot \{\cos(\theta 5)\} \cdot \sin\{(\omega 0 - \omega 1) \cdot t\}\end{aligned} \quad (123)$$

Substituting mf into mp, equation (123) is equivalent to equation (94). Hence, the frequency modulation is equivalent to the phase modulation. In the following embodiment wherein an exciting current obtained by phase modulation of a carrier wave is supplied to an exciting coil, frequency modulation is equivalent to phase modulation. Hence, a description of the frequency modulation will be omitted.

Sixth Embodiment

The sixth embodiment of the present invention will be described next. This embodiment uses the second extraction method as a method of extracting an estimated value Va' of a vector Va of a ∂A/∂t component, of the methods described in the basic principle, and is configured to apply phase-/frequency-modulated magnetic fields to a fluid to be measured and extract the estimated value Va' of the vector Va of the ∂A/∂t component by using the difference between a plurality of frequency components contained in an inter-electrode electromotive force. The arrangement of the electromagnetic flowmeter of this embodiment is the same as that of the electromagnetic flowmeter according to the first embodiment shown in FIG. 6. Therefore, the principle of this embodiment will be described by using the same reference numerals as in FIG. 6.

Letting E5s be the sum of the inter-electrode electromotive force E5p represented by equation (102) and the inter-electrode electromotive force E5m represented by equation (103), the electromotive force sum E5s is given by $$\begin{aligned}E5s &= E5p + E5m \\&= J_1(mp) \cdot rk \cdot b5 \cdot \exp\{j \cdot (\pi/2 + \theta 5 + \theta 00)\} \cdot \\&\quad \{(\omega 0 + \omega 1) \cdot \exp(j \cdot \pi/2) + \gamma \cdot V \cdot \exp\{j \cdot \Delta\theta 01)\} +\end{aligned} \quad (124)$$

-continued $$\{(\omega 0 - \omega 1) \cdot \exp(j \cdot \pi/2) + \gamma \cdot V \cdot \exp\{j \cdot \Delta \theta 01\}\}$$

$$= 2 \cdot J_1(mp) \cdot rk \cdot b5 \cdot \exp\{j \cdot (\pi/2 + \theta 5 + \theta 00)\} \cdot$$

$$\{\omega 0 \cdot \exp(j \cdot \pi/2) + \gamma \cdot V \cdot \exp\{j \cdot \Delta \theta 01\}\}$$

Letting EdA6 be the result obtained by multiplying the difference between the inter-electrode electromotive forces E5$p$ and E5$m$ by ($\omega 0/\omega 1$), equation (125) holds:

$$EdA6 = (E5p - E5m) \cdot (\omega 0 / \omega 1) \quad (125)$$

$$= J_1(mp) \cdot rk \cdot b5 \cdot \exp\{j \cdot \pi/2 + \theta 5 + \theta 00)\} \cdot$$

$$\{(\omega 0 + \omega 1) \cdot \exp(j \cdot \pi/2) + \gamma 0 \cdot V \cdot \exp\{j \cdot \Delta \theta 01\} -$$

$$(\omega 0 - \omega 1) \cdot \exp(j \cdot \pi/2) - \gamma 0 \cdot V \cdot \exp\{j \cdot \Delta \theta 01\}\} \cdot$$

$$\omega 0 / \omega 1$$

$$= [2 \cdot j_1(mp) \cdot rk \cdot b5 \cdot \exp\{j \cdot (\pi + \theta 5 + \theta 00)\} \cdot \omega 0$$

An electromotive force difference EdA6 represented by equation (125) is irrelevant to a magnitude V of the flow velocity, and hence is only the component generated by $\partial A/\partial t$. The electromotive force difference EdA6 is used to extract the v×B component from the inter-electrode electromotive force E5$s$ (the resultant vector Va+Vb). To be precise, the electromotive force difference EdA6 is the value obtained by multiplying the electromotive force difference between the inter-electrode electromotive forces E5$p$ and E5$m$ by ($\omega 0/\omega 1$). However, the reason why this electromotive force difference is multiplied by ($\omega 0/\omega 1$) is to facilitate the development of an equation.

Letting EvB6 be the v×B component obtained by subtracting the electromotive force difference EdA6 represented by equation (125) from the inter-electrode electromotive force E5$s$ represented by equation (124), the v×B component EvB6 is represented by $$EvB6 = E5s - EdA6 \quad (126)$$

$$= 2 \cdot J_1(mp) \cdot rk \cdot b5 \cdot \exp\{j \cdot (\pi/2 + \theta 5 + \theta 00)\} \cdot$$

$$\{\omega 0 \cdot \exp(j \cdot \pi/2) + \gamma \cdot V \cdot \exp\{j \cdot \Delta \theta 01\}\} -$$

$$[2 \cdot J_1(mp) \cdot rk \cdot b5 \cdot \exp\{j \cdot (\pi + \theta 5 + \theta 00)\}] \cdot \omega 0$$

$$= [2 \cdot J_1(mp) \cdot \gamma \cdot rk \cdot b5 \cdot$$

$$\exp\{j \cdot (\pi/2 + \theta 5 + \theta 00 + \Delta \theta 01)\}] \cdot V$$

Figure 15A:
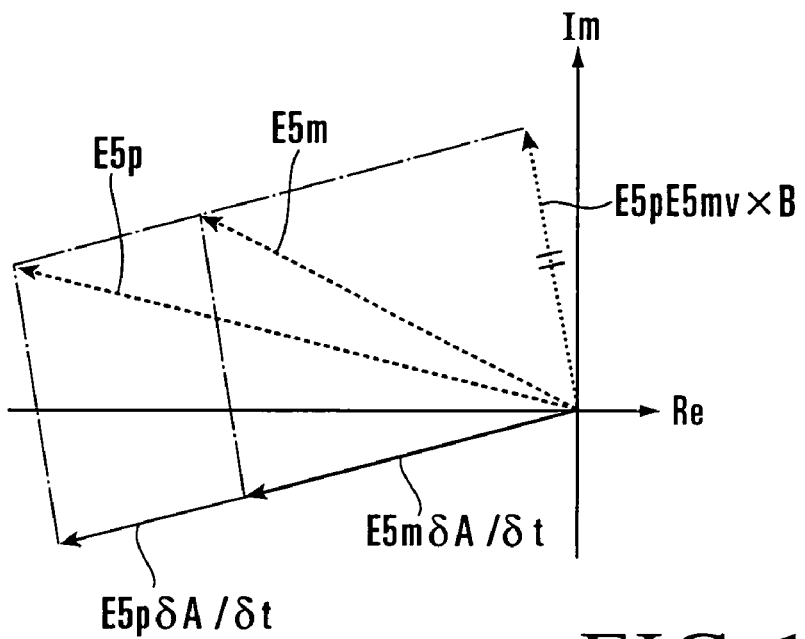
FIG. 15A is a view expressing inter-electrode electromotive forces in the form of complex vectors according to the sixth embodiment of the present invention.
Figure 15B:
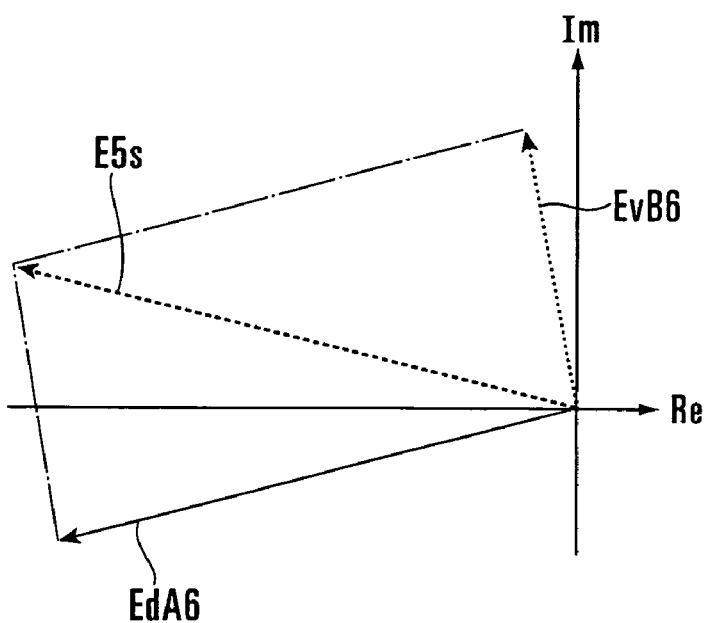
FIG. 15B is a view expressing an electromotive force sum, electromotive force difference, and v×B component in the form of complex vectors according to the sixth embodiment of the present invention.
Figure 16:
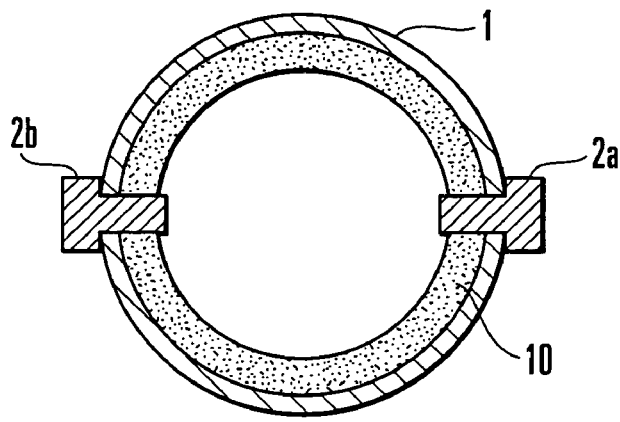
FIG. 16 is a sectional view showing an example of electrodes used in an electromagnetic flowmeter according to the present invention.

The v×B component EvB6 is irrelevant to the angular frequencies $\omega 0$ and $\omega 1$. If the magnitude V of the flow velocity is 0, the v×B component EvB6 is also 0. Accordingly, the output with the corrected zero point can be obtained based on the v×B component EvB6. FIG. 15A shows the inter-electrode electromotive forces E5$p$ and E5$m$ in the form of complex vectors. FIG. 15B shows the electromotive force sum E5$s$, the electromotive force difference EdA6, and the v×B component EvB6 in the form of complex vectors. In FIG. 15A, E5$p\partial$A/$\partial$t represents the $\partial$A/$\partial$t component J$_1$(mp)·rk·b5·exp{j·($\pi+\theta5+\theta00$)}·($\omega0+\omega1$) of the inter-electrode electromotive force E5$p$, and E5$m\partial$A/$\partial$t represents the $\partial$A/$\partial$t component J$_1$(mp)·rk·b5·exp{j·($\pi+\theta5+\theta00$)}·($\omega0-\omega1$) of the inter-electrode electromotive force E5$m$. E5$p$E5$m$v×B represents the v×B component of each of the inter-electrode electromotive forces E5$p$ and E5$m$. In equation (126), the magnitude and direction of a coefficient to be applied to the magnitude V of the flow velocity are represented by a complex vector [2·J$_1$(mp)·$\gamma$·rk·b5·exp{j·($\pi/2+\theta5+\theta00)+\Delta\theta01$)}].

According to equation (126), the magnitude V of the flow velocity is expressed by $$V = |EvB6 / [2 \cdot J_1(mp) \cdot \gamma \cdot rk \cdot b5 \cdot \quad (127)$$

$$\exp\{j \cdot (\pi/2 + \theta 5 + \theta 00 + \Delta \theta 01)\}]|$$

$$= EvB6 / (2 \cdot J_1(mp) \cdot \gamma \cdot rk \cdot b5)$$

Table 6 shows the correspondence relationship between the constants and variables used in the basic principle described above and the constants and variables in this embodiment. As is obvious from Table 6, this embodiment is an example of specifically implementing the basic principle described above.

TABLE 6

Correspondence Relationship between Basic Principle and Sixth Embodiment

| Constants and Variables in Basic Principle | Constants and Variables in Sixth Embodiment |
|---|---|
| Va + Vb | E5s |
| Va' (= Va) | EdA6 |
| Vb | EvB6 |
| r$\omega$ | 2 · J$_1$ (mp) · rk · b5 |
| $\theta\omega$ | $\pi$/2 + $\theta$5 + $\theta$00 |
| rv | 2 · J$_1$ (mp) · $\gamma$ · rk · b5 |
| $\theta$v | $\pi$/2 + $\theta$5 + $\theta$00 + $\Delta\theta$01 |

A specific arrangement of the electromagnetic flowmeter of this embodiment and its operation will be described next. As described above, the arrangement of the electromagnetic flowmeter of this embodiment is the same as that in FIG. 6, and hence the electromagnetic flowmeter of this embodiment will be described by using the reference numerals in FIG. 6. The electromagnetic flowmeter of this embodiment includes a measuring tube 1, electrodes 2*a* and 2*b*, an exciting coil 3, a power supply unit 4, a signal conversion unit 5 which obtains amplitudes and phases of two different angular frequency components from a component with an angular frequency $\omega 0 \pm \xi \cdot \omega 1$ (where $\xi$ is a positive integer) of the resultant electromotive force detected by the electrodes 2*a* and 2*b*, and extracts the electromotive force difference between the two angular frequency components as the $\partial$A/$\partial$t component on the basis of the amplitudes and the phases, and a flow rate output unit 6 which extracts only the v×B component by removing the $\partial$A/$\partial$t component from the electromotive force sum of the two angular frequency components of the component with an angular frequency $\omega 0 \pm \xi \cdot \omega 1$ of the resultant electromotive force, and calculates the flow rate of the fluid based on the v×B component.

The power supply unit 4 supplies, to the exciting coil 3, an exciting current obtained by phase-/frequency-modulating the sine carrier wave with the angular frequency $\omega 0$ and the sine modulation wave with the angular frequency $\omega 1$. In this case, the phase modulation index mp is an arbitrary value.

The operation procedures of the signal conversion unit 5 and flow rate output unit 6 according to this embodiment are the same as those according to the fourth embodiment. Therefore, the operations of the signal conversion unit 5 and flow rate output unit 6 will be described by using the same reference numerals as in FIG. 13. First of all, the signal conversion unit 5 causes a phase detector (not shown) to obtain an amplitude r5p of the electromotive force E5p with the angular frequency (ω0+ω1) component of the electromotive force between the electrodes 2a and 2b, and obtain a phase difference φp between the real axis and the inter-electrode electromotive force E5p. Subsequently, the signal conversion unit 5 causes the phase detector to obtain an amplitude r5m of the electromotive force E5m with the angular frequency (ω0−ω1) component of the electromotive force between the electrodes 2a and 2b, and obtain a phase difference φ5m between the real axis and the inter-electrode electromotive force E5m (step 401 in FIG. 13). As described above, the inter-electrode electromotive forces E5p and E5m can also separate the frequency by a bandpass filter or comb filter.

The signal conversion unit 5 then calculates a real axis component E5px and imaginary axis component E5py of the inter-electrode electromotive force E5p, a real axis component E5mx and imaginary axis component E5my of the inter-electrode electromotive force E5m, and a real axis component E5sx and imaginary axis component E5sy of the electromotive force sum E5s according to the following equations (step 402):

$$E5px = r5p \cdot \cos(\phi 5p) \quad (128)$$

$$E5py = r5p \cdot \sin(\phi 5p) \quad (129)$$

$$E5mx = r5m \cdot \cos(\phi 5m) \quad (130)$$

$$E5my = r5m \cdot \sin(\phi 5m) \quad (131)$$

$$E5sx = E5px + E5mx \quad (132)$$

$$E5sy = E5py + E5my \quad (133)$$

After the calculation of equations (128) to (133), the signal conversion unit 5 obtains the magnitude of the electromotive force difference EdA6 between the inter-electrode electromotive forces E5p and E5m (step 403). The processing in step 403 corresponds to the processing of obtaining a ∂A/∂t component, and is equivalent to the calculation of equation (125). The signal conversion unit 5 calculates a real axis component EdA6x and imaginary axis component EdA6y of the electromotive force difference EdA6 according to the following equation:

$$EdA6x = (E5px - E5mx) \cdot (\omega 0/\omega 1) \quad (134)$$

$$EdA6y = (E5py - E5my) \cdot (\omega 0/\omega 1) \quad (135)$$

The flow rate output unit 6 then obtains the magnitude of the v×B component EvB6 by removing the electromotive force difference EdA6 from the electromotive force sum E5s (step 404). The processing in step 404 is equivalent to the calculation of equation (126). The flow rate output unit 6 calculates a magnitude |EvB6| of the v×B component EvB6 according to the following equation:

$$|EvB6| = \{(E5sx - EdA6x)^2 + (E5sy - EdA6y)^2\}^{1/2} \quad (136)$$

The flow rate output unit 6 then calculates the magnitude V of the flow velocity of the fluid to be measured according to the following equation (step 405). The processing in step 405 is equivalent to the calculation of equation (127).

$$V = |EvB6|/rv$$

wherein a proportion coefficient rv is a constant which can be obtained in advance by calibration or the like. The Bessel function $J_1(mp)$ in the proportion coefficient rv is an arbitrary value. The signal conversion unit 5 and the flow rate output unit 6 perform the processing in steps 401 to 405 described above in a predetermined cycle until, for example, the end of the measurement is designated by the operator (YES in step 406).

As described above, this embodiment is configured to apply the magnetic field obtained by phase-/frequency-modulating the carrier wave with the angular frequency ω0 by using the modulated wave with the angular frequency ω1, to the fluid to be measured, extract the electromotive force difference EdA6 (∂A/∂t component vector Va) between the electromotive force E5p with the angular frequency (ω0+ω1) component and the electromotive force E5m with the angular frequency (ω0−ω1) component of the electromotive force between the electrodes 2a and 2b, extract the v×B component by removing the ∂A/∂t component from the electromotive force fun E5s (the resultant vector Va+Vb), and calculate, based on the v×B component, the flow rate of the fluid to be measured. Hence, the zero point of the output of the electromagnetic flowmeter can be corrected without setting the flow rate of a fluid to be measured to 0, and the stability of the zero point can be ensured even in high-frequency excitation. In this embodiment, there is no need to switch the exciting frequency as in the first embodiment. Hence, the flow rate can be calculated at higher speed.

The essence of the present invention is to provide a method of removing a ∂A/∂t component from a resultant vector Va+Vb regardless of the structure of an electromagnetic flowmeter. That is, the present invention can remove ∂A/∂t components regardless of where they are induced, e.g., a ∂A/∂t component induced in a fluid to be measured, a ∂A/∂t component directly induced in an electrode, and a ∂A/∂t component directly induced in a signal line. For the sake of easy explanation, the first to sixth embodiments have exemplified the operation of removing a ∂A/∂t component generated in a fluid to be measured in the electromagnetic flowmeter having the structure in which the exciting coil is placed at a position spaced apart from the electrode axis by the offset distance d in the measuring tube axis direction. However, the present invention is not limited to this, and can be applied to an electromagnetic flowmeter having another structure.

In addition, the first to sixth embodiments use the sine wave excitation scheme using sine wave for an exciting current. However, the embodiments may use the rectangular wave excitation scheme using a rectangular wave for an exciting current.

Figure 17:
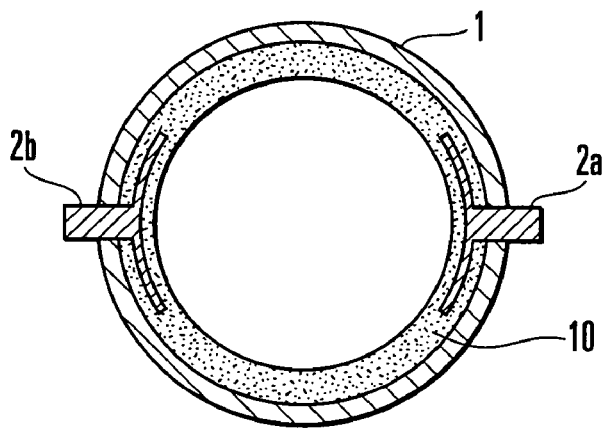
FIG. 17 is a sectional view showing another example of electrodes used in the electromagnetic flowmeter according to the present invention.
Figure 18:
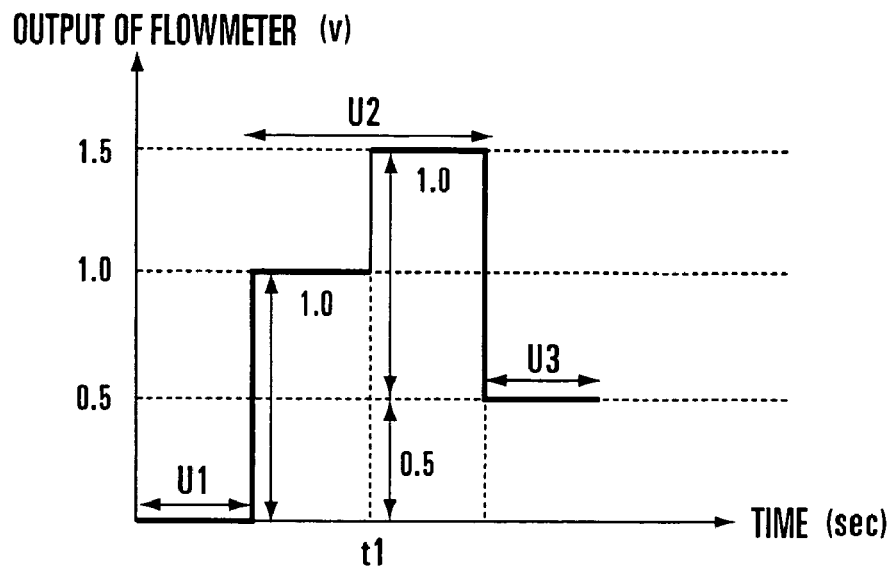
FIG. 18 is a view for explaining the shift of the zero point of the electromagnetic flowmeter.

As the electrodes 2a and 2b, the first to sixth embodiments may use electrodes which are shaped to be exposed from the inner wall of the measuring tube 1 and come into contact with a fluid to be measured, or capacitive coupling type electrodes which do not come into contact with a fluid to be measured as shown in FIG. 17. When the electrodes 2a and 2b are of the capacitive coupling type, they are coated with a lining 10 made of ceramic, Teflon (registered trademark), or the like formed on the inner wall of the measuring tube 1.

The first to sixth embodiments use one pair of electrodes 2a and 2b as the first electrodes. However, the present invention is not limited to this. These embodiments may use one electrode. If only one electrode is to be used, a ground ring or ground electrode for grounding the potential of a fluid to be measured is provided on the measuring tube 1, and the electromotive force (the potential difference from the ground potential) generated on the one electrode may be detected by the signal conversion unit 5. When one pair of electrodes are to be used, an electrode axis is a straight line connecting the pair of electrodes. When only one electrode is to be used, an electrode axis is a straight line connecting the real electrode to a virtual electrode, assuming that the virtual electrode is placed at a position to face the real electrode through the measuring tube axis PAX on the plane PLN including the one real electrode.

According to the fifth and sixth embodiments, in the expansion of a primary Bessel function, the present invention is applied to only the case of n=0, 1, and uses a component with the angular frequency $\omega 0 \pm \omega 1$ of an inter-electrode electromotive force. However, the present invention is not limited to this, and may use a component with $\omega 0 \pm \xi \cdot \omega 1$ ($\xi$ is a positive integer). If $\xi$ is an integer equal to or more than two, applying the present invention to the case of n=2 in the expansion of a primary Bessel function makes it possible to calculate the magnitude V of a flow velocity.

Furthermore, in the first to sixth embodiments, of the signal conversion unit 5 and the flow rate output unit 6, components except for those used for the detection of electromotive forces can be implemented by a computer including a CPU, storage device, and interface, and programs which control these hardware resources.

INDUSTRIAL APPLICABILITY

The present invention is applicable to flow rate measurement of a fluid to be measured which flows in a measuring tube.

The invention claimed is:

1. An electromagnetic flowmeter characterized by comprising:
   a measuring tube through which a fluid to be measured flows;
   an exciting unit which applies a time-changing magnetic field to the fluid;
   an electrode which is placed in said measuring tube and detects a resultant electromotive force of an electromotive force based on a $\partial A/\partial t$ component (where A is a vector potential and t is a time) which is generated by a magnetic field applied to the fluid and a flow of the fluid and is irrelevant to a flow velocity of the fluid and an electromotive force based on a v×B component (where v is a flow velocity and B is a magnetic flux density) originating from the flow velocity of the fluid;
   a signal conversion unit which extracts the $\partial A/\partial t$ component from the resultant electromotive force; and
   a flow rate output unit which extracts only the v×B component by removing the extracted $\partial A/\partial t$ component from the resultant electromotive force, and calculates the flow rate of the fluid from the v×B component.

2. An electromagnetic flowmeter according to claim 1, characterized in that
   said exciting unit applies the magnetic field to the fluid while switching exciting frequencies,
   said signal conversion unit obtains an amplitude and phase of the resultant electromotive force in each of at least two excitation states in which the exciting frequencies differ from each other, and extracts the $\partial A/\partial t$ component on the basis of the amplitude and phase of the resultant electromotive force, and
   said flow rate output unit extracts only the v×B component by removing the extracted $\partial A/\partial t$ component from the resultant electromotive force in one of the excitation states, and calculates the flow rate of the fluid from the v×B component.

3. An electromagnetic flowmeter according to claim 2, characterized in that said signal conversion unit obtains an amplitude and phase of the resultant electromotive force in each of a first excitation state and a second excitation state in which the exciting frequencies differ from each other, and extracts an electromotive force difference between a resultant electromotive force in the first excitation state and a resultant electromotive force in the second excitation state as the $\partial A/\partial t$ component on the basis of the amplitudes and phases of the resultant electromotive forces.

4. An electromagnetic flowmeter according to claim 1, characterized in that
   said exciting unit applies the magnetic field to the fluid by using a plurality of exciting frequencies, said
   signal conversion unit extracts the $\partial A/\partial t$ component by obtaining amplitudes and phases of at least two different frequency components of the resultant electromotive force detected by said electrode, and
   said flow rate output unit extracts only the v×B component by removing the extracted $\partial A/\partial t$ component from at least one frequency component of the resultant electromotive force, and calculates the flow rate of the fluid from the v×B component.

5. An electromagnetic flowmeter according to claim 4, characterized in that said signal conversion unit obtains amplitudes and phases of two frequency components with the first frequency and the second frequency of a resultant electromotive force detected by said electrode, and extracts an electromotive force difference between the two frequency components as a $\partial A/\partial t$ component on the basis of the amplitudes and the phases.

6. An electromagnetic flowmeter according to claim 4, characterized in that
   said exciting unit applies, to the fluid, a magnetic field obtained by modulating a carrier wave with an angular frequency $\omega 0$ using a modulation wave with an angular frequency $\omega 1$, and
   said signal conversion unit extracts the $\partial A/\partial t$ component by obtaining amplitudes and phases of at two different angular frequency components from a component with an angular frequency $\omega 0 \pm \xi \cdot \omega 1$ (where $\xi$ is a positive integer) of the resultant electromotive force detected by said electrode.

7. An electromagnetic flowmeter according to claim 6, characterized in that
   said exciting unit applies, to the fluid, a magnetic field obtained by amplitude-modulating a carrier wave with an angular frequency $\omega 0$ using a modulation wave with an angular frequency $\omega 1$, and
   said signal conversion unit extracts the $\partial A/\partial t$ component by obtaining amplitudes and phases of two angular frequency components with angular frequencies $\omega 0 + \omega 1$ and $\omega 0 - \omega 1$ of the resultant electromotive force detected by said electrode.

8. An electromagnetic flowmeter according to claim 6, characterized in that
   said signal conversion unit obtains amplitudes and phases of two angular frequency components with angular frequencies $\omega 0 + 1$ and $\omega 0 - \omega 1$ of the resultant electromotive force detected by said electrode, and extracts an electromotive force difference between the two angular frequency components as the $\partial A/\partial t$ component on the basis of the amplitudes and the phases, and
   said flow rate output unit extracts only the v×B component by removing the extracted 7 $A/\partial t$ component from a component with the angular frequency $\omega 0$ of the resultant electromotive force, and calculates the flow rate of the fluid from the v×B component.

9. An electromagnetic flowmeter according to claim 7, characterized in that
   said signal conversion unit obtains amplitudes and phases of two angular frequency components with angular frequencies ω0+ω1 and ω0−ω1 of the resultant electromotive force detected by said electrode, and extracts an electromotive force difference between the two angular frequency components as the ∂A/∂t component on the basis of the amplitudes and the phases, and said flow rate output unit extracts only the v×B component by removing the extracted ∂A/∂t component from an electromotive force sum of the two angular frequency components of the resultant electromotive force, and calculates the flow rate of the fluid from the v×B component.

10. An electromagnetic flowmeter according to claim 6, characterized in that said exciting unit applies, to the fluid, the magnetic field obtained by one of phase modulation and frequency modulation of a carrier wave with an angular frequency ω0 using a modulation wave with an angular frequency ω1.

11. An electromagnetic flowmeter according to claim 10, characterized in that said signal conversion unit obtains amplitudes and phases of two different angular frequency components from a component with an angular frequency ω0±ξ·ω1 (where ξ is a positive integer) of the resultant electromotive force detected by said electrode, and extracts an electromotive force difference between the two angular frequency components as the ∂A/∂t component on the basis of the amplitudes and the phases, and the flow rate output unit extracts the v×B component by removing the extracted ∂A/∂t component from an arbitrary kind of component of the components with the angular frequencies ω0 and ω0±ξ·ω1 of the resultant electromotive force, and calculates the flow rate of the fluid from the v×B component.

12. An electromagnetic flowmeter according to claim 10, characterized in that said signal conversion unit obtains amplitudes and phases of two different angular frequency components from a component with an angular frequency ω0±ξ·ω1 (where ξ is a positive integer) of the resultant electromotive force detected by said electrode, and extracts an electromotive force difference between the two angular frequency components as the ∂A/∂t component on the basis of the amplitudes and the phases, and the flow rate output unit extracts only the v×B component by removing the extracted ∂A/∂t component from an electromotive force sum of the two angular frequency components with the angular-frequencies ω0 and ω0±ξ·ω1 of the resultant electromotive force, and calculates the flow rate of the fluid from the v×B component.

* * * * *

UNITED STATES PATENT AND TRADEMARK OFFICE
CERTIFICATE OF CORRECTION

PATENT NO.         : 7,496,455 B2                                            Page 1 of 1
APPLICATION NO. : 11/628556
DATED              : February 24, 2009
INVENTOR(S)        : Yamamoto It is certified that error appears in the above-identified patent and that said Letters Patent is hereby corrected as shown below:

Col. 44 in Claim 8, line 60, please delete "7 A/∂t" and insert -- ∂A/∂t --.

Signed and Sealed this

Twenty-sixth Day of May, 2009

JOHN DOLL
*Acting Director of the United States Patent and Trademark Office*